US009507330B2

United States Patent
Nagamatsu et al.

(10) Patent No.: US 9,507,330 B2
(45) Date of Patent: Nov. 29, 2016

(54) FUNCTION MANAGING DEVICE, REMOTE CONTROL SYSTEM, METHOD FOR CONTROLLING FUNCTION MANAGING DEVICE, AND RECORDING MEDIUM STORING CONTROL PROGRAM THEREIN

(71) Applicant: SHARP KABUSHIKI KAISHA, Osaka-shi, Osaka (JP)

(72) Inventors: Takayuki Nagamatsu, Osaka (JP); Chie Hideishi, Osaka (JP); Masaki Hashiura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 359 days.

(21) Appl. No.: 14/198,673

(22) Filed: Mar. 6, 2014

(65) Prior Publication Data

US 2014/0257525 A1  Sep. 11, 2014

(30) Foreign Application Priority Data

Mar. 8, 2013  (JP) ................................ 2013-047275

(51) Int. Cl.
| | |
|---|---|
| G05B 15/02 | (2006.01) |
| H04L 12/28 | (2006.01) |
| H04N 21/41 | (2011.01) |
| G08C 17/00 | (2006.01) |
| H04N 21/4227 | (2011.01) |
| H04N 21/436 | (2011.01) |
| H04N 5/44 | (2011.01) |

(52) U.S. Cl.
CPC ............... *G05B 15/02* (2013.01); *G08C 17/00* (2013.01); *H04L 12/2816* (2013.01); *H04N 21/4131* (2013.01); *H04N 21/4227* (2013.01); *H04N 21/43615* (2013.01); *G08C 2201/20* (2013.01); *H04N 5/4403* (2013.01)

(58) Field of Classification Search
None
See application file for complete search history.

(56) References Cited

U.S. PATENT DOCUMENTS

| | | | | |
|---|---|---|---|---|
| 5,841,959 | A * | 11/1998 | Guiremand | ............ B25J 9/1671 345/440 |
| 2004/0260407 | A1 * | 12/2004 | Wimsatt | ................. G05B 15/02 700/19 |
| 2004/0260427 | A1 * | 12/2004 | Wimsatt | ................. G05B 15/02 700/275 |
| 2010/0191352 | A1 * | 7/2010 | Quail | ................... H04L 12/2809 700/90 |
| 2011/0296313 | A1 * | 12/2011 | Gaxiola | ................. G08C 17/02 715/744 |
| 2013/0041951 | A1 * | 2/2013 | Lee | ......................... G05B 15/02 709/204 |
| 2014/0067094 | A1 * | 3/2014 | Park | ........................ G05B 15/02 700/90 |
| 2014/0067131 | A1 * | 3/2014 | Park | ..................... A47L 15/4293 700/275 |
| 2014/0156081 | A1 * | 6/2014 | Ha | ........................... D06F 33/02 700/275 |
| 2014/0163751 | A1 * | 6/2014 | Davis | ...................... H04L 12/12 700/286 |

FOREIGN PATENT DOCUMENTS

| | | |
|---|---|---|
| JP | 11-031062 | 2/1999 |
| JP | 2006-031347 | 2/2006 |
| JP | 2006-209515 | 8/2006 |
| JP | 2010-021987 A | 1/2010 |

* cited by examiner

*Primary Examiner* — Qing Wu
(74) *Attorney, Agent, or Firm* — Nixon & Vanderhye P.C.

(57) ABSTRACT

In a remote control system that causes a controlled appliance to perform a function specified with use of a terminal device, a function managing device manages functions including a first function and a second function associated with the first function.

11 Claims, 18 Drawing Sheets

FIG. 3

| FUNCTION ID | FUNCTION CATEGORY | OPERATION TARGET HOME ELECTRIC APPLIANCE | FUNCTION | PAIRED FUNCTION |
|---|---|---|---|---|
| F001 | HOME ELECTRIC APPLIANCE OPERATION | AIR CONDITIONER | OFF | — |
| F002 | HOME ELECTRIC APPLIANCE OPERATION | AIR CONDITIONER | HEATING ON | F001 |
| F003 | HOME ELECTRIC APPLIANCE OPERATION | AIR CONDITIONER | COOLING ON | F001 |
| F004 | HOME ELECTRIC APPLIANCE OPERATION | AIR CONDITIONER | DRYING ON | F001 |
| F005 | HOME ELECTRIC APPLIANCE OPERATION | LED ILLUMINATION DEVICE | OFF | — |
| F006 | HOME ELECTRIC APPLIANCE OPERATION | LED ILLUMINATION DEVICE | LIGHTING WITH FULL BRIGHTNESS | F005 |
| F007 | HOME ELECTRIC APPLIANCE OPERATION | LED ILLUMINATION DEVICE | DEFAULT LIGHTING | F005 |
| F008 | HOME ELECTRIC APPLIANCE OPERATION | LED ILLUMINATION DEVICE | NIGHT LIGHT | F005 |
| F009 | HOME ELECTRIC APPLIANCE OPERATION | LED ILLUMINATION DEVICE | DOUBLE CHERRY BLOSSOM | F005 |
| F010 | HOME ELECTRIC APPLIANCE OPERATION | LED ILLUMINATION DEVICE | SOMEIYOSHINO | F005 |
| F011 | HOME ELECTRIC APPLIANCE OPERATION | ION GENERATOR | OFF | — |
| F012 | HOME ELECTRIC APPLIANCE OPERATION | ION GENERATOR | ON | F011 |
| F013 | ACTION | — | CLEANING | — |
| F014 | ACTION | — | PHOTOGRAPHING | — |
| F015 | MOVE | — | MOVE TO NEAR AIR CONDITIONER | — |
| F016 | MOVE | — | MOVE TO LED ILLUMINATION DEVICE | — |
| F017 | MOVE | — | MOVE TO NEAR ION GENERATOR | — |
| F018 | ROTATE | — | ROTATE CLOCKWISE BY 90 DEGREES | — |
| ⋮ | ⋮ | ⋮ | ⋮ | ⋮ |

FIG. 4
| LABEL ID | LABEL | ASSOCIATED FUNCTION |
|---|---|---|
| SE001 |  | F001:TURN OFF AIR CONDITIONER |
| SE002 |  | F002:TURN ON AIR CONDITIONER FOR HEATING |
| SE003 | 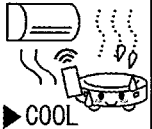 | F003:TURN ON AIR CONDITIONER FOR COOLING |
| SE004 |  | F004:TURN ON AIR CONDITIONER FOR DRYING |
| SE005 | 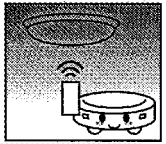 | F005:TURN OFF LED ILLUMINATION |
| SE006 |  | F006:TURN ON LED ILLUMINATION WITH FULL BRIGHTNESS |
| ⋮ | ⋮ | ⋮ |
| SE013 |  | F013:CLEANING |
| SE014 | 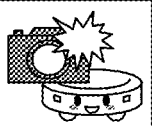 | F014:PHOTOGRAPHING |
| ⋮ | ⋮ | ⋮ |

| SCENARIO ID | SCENARIO NAME | LABEL | ORDER | FUNCTION ID | FUNCTION |
|---|---|---|---|---|---|
| SC001 | MOVE TO AIR CONDITIONER IN LIVING ROOM + HEATING ON + PHOTOGRAPHING | | NO. 1 | F015_LIV | MOVE TO NEAR AIR CONDITIONER IN LIVING ROOM |
| | | | NO. 2 | F002_LIV | TURN ON AIR CONDITIONER IN LIVING ROOM FOR HEATING |
| | | | NO. 3 | F014 | PHOTOGRAPHING |

(b)

| SCENARIO ID | SCENARIO NAME | LABEL | ORDER | FUNCTION ID | FUNCTION |
|---|---|---|---|---|---|
| SC001 | MOVE TO AIR CONDITIONER IN LIVING ROOM + HEATING ON + PHOTOGRAPHING | 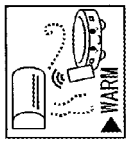 | NO. 1 | F015_LIV | MOVE TO NEAR AIR CONDITIONER IN LIVING ROOM |
| | | | NO. 2 | F002_LIV | TURN ON AIR CONDITIONER IN LIVING ROOM FOR HEATING |
| | | | NO. 3 | F014 | PHOTOGRAPHING |

(c)

| SCENARIO ID | SCENARIO NAME | LABEL | ORDER | FUNCTION ID | FUNCTION |
|---|---|---|---|---|---|
| SC002 | MOVE TO AIR CONDITIONER IN LIVING ROOM + OFF + PHOTOGRAPHING | 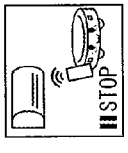 | NO. 1 | F015_LIV | MOVE TO NEAR AIR CONDITIONER IN LIVING ROOM |
| | | | NO. 2 | F001_LIV | TURN OFF AIR CONDITIONER IN LIVING ROOM |
| | | | NO. 3 | F014 | PHOTOGRAPHING |

FIG. 8

| SCENARIO ID | SCENARIO NAME | LABEL | ORDER | FUNCTION ID | FUNCTION |
|---|---|---|---|---|---|
| SC001 | MOVE TO AIR CONDITIONER IN LIVING ROOM + HEATING ON + PHOTOGRAPHING | 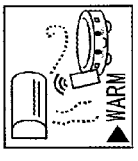 | NO. 1 | F015_LIV | MOVE TO NEAR AIR CONDITIONER IN LIVING ROOM |
| | | | NO. 2 | F002_LIV | TURN ON AIR CONDITIONER IN LIVING ROOM FOR HEATING |
| | | | NO. 3 | F014 | PHOTOGRAPHING |
| SC002 | MOVE TO AIR CONDITIONER IN LIVING ROOM + OFF + PHOTOGRAPHING | 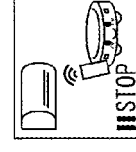 | NO. 1 | F015_LIV | MOVE TO NEAR AIR CONDITIONER IN LIVING ROOM |
| | | | NO. 2 | F001_LIV | TURN OFF AIR CONDITIONER IN LIVING ROOM |
| | | | NO. 3 | F014 | PHOTOGRAPHING |
| SC003 | MOVE TO LED ILLUMINATION DEVICE IN BEDROOM + LIGHTING WITH FULL | 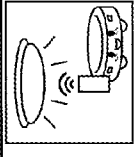 | NO. 1 | F016_BED | MOVE TO NEAR LED ILLUMINATION DEVICE IN BEDROOM |
| | | | NO. 2 | F006_BED | LED ILLUMINATION DEVICE IN BEDROOM LIGHTING WITH FULL BRIGHTNESS |
| SC004 | MOVE TO LED ILLUMINATION DEVICE IN BEDROOM + OFF | 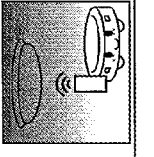 | NO. 1 | F016_BED | MOVE TO NEAR LED ILLUMINATION DEVICE IN BEDROOM |
| | | | NO. 2 | F005_BED | TURN OFF LED ILLUMINATION DEVICE IN BEDROOM |
| SC005 | MOVE TO LED ILLUMINATION DEVICE IN BEDROOM + OFF + CLEANING | 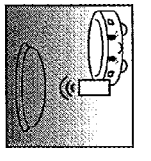 | NO. 1 | F016_BED | MOVE TO NEAR LED ILLUMINATION DEVICE IN BEDROOM |
| | | | NO. 2 | F005_BED | TURN OFF LED ILLUMINATION DEVICE IN BEDROOM |
| | | | NO. 3 | F013 | CLEANING |
| ⋮ | ⋮ | ⋮ | ⋮ | ⋮ | ⋮ |

FIG. 10

| MODULE ID | FUNCTION MODULE |
|---|---|
| FM1 | 1 BLOCK (0.5 m) FORWARD |
| FM2 | CHANGE DIRECTION CLOCKWISE BY 90 DEGREES |
| FM3 | CHANGE DIRECTION COUNTERCLOCKWISE BY 90 DEGREES |
| FM4 | TILT CONTROL |
| FM5 | PAN CONTROL |
| FM6 | SHUTTER |
| ⋮ | ⋮ |

FIG. 11

| COMMUNITY ID | ROOM ID | FUNCTION ID | FUNCTION RECIPE |
|---|---|---|---|
| - | - | F014 | FM4×1 → FM5×1 → FM6×1 |
| FAMILY S | LIV | F015 | FM1×2 → FM2×1 → FM1×7 → FM3×1 → FM1×2 |
| FAMILY S | BED | F015 | FM1×1 → FM2×1 → FM1×1 → FM2×1 → FM1×1 → FM3×1 → FM1×3 → FM2×1 → FM1×4 → FM2×1 → FM1×4 |
| FAMILY S | LIV | F016 | FM1×2 → FM2×1 → FM1×4 → FM3×1 → FM1×1 |
| FAMILY S | LIV | F017 | FM1×2 → FM2×1 → FM1×7 → FM3×1 → FM1×2 → FM2×1 |
| : | : | : | : |
| FAMILY T | LIV | F015 | **** |
| FAMILY T | BED | F015 | **** |
| : | : | : | : |

| ORDER | FUNCTION ID |
|---|---|
| NO. 1 | F015_LIV |
| NO. 2 | F002_LIV |
| NO. 3 | F014 |

(b)

| ORDER | FUNCTION RECIPE |
|---|---|
| NO. 1 | FM1×2 → FM2×1 → FM1×7 → FM3×1 → FM1×2 |
| NO. 2 | TURN ON AIR CONDITIONER IN LIVING ROOM FOR HEATING |
| NO. 3 | FM4×1 → FM5×1 → FM6×1 |

(c)

| | |
|---|---|
| 1 | 1 BLOCK (0.5 m) FORWARD |
| 2 | 1 BLOCK (0.5 m) FORWARD |
| 3 | CHANGE DIRECTION CLOCKWISE BY 90 DEGREES |
| 4 | 1 BLOCK (0.5 m) FORWARD |
| 5 | 1 BLOCK (0.5 m) FORWARD |
| 6 | 1 BLOCK (0.5 m) FORWARD |
| 7 | 1 BLOCK (0.5 m) FORWARD |
| 8 | 1 BLOCK (0.5 m) FORWARD |
| 9 | 1 BLOCK (0.5 m) FORWARD |
| 10 | 1 BLOCK (0.5 m) FORWARD |
| 11 | CHANGE DIRECTION COUNTERCLOCKWISE BY 90 DEGREES |
| 12 | 1 BLOCK (0.5 m) FORWARD |
| 13 | 1 BLOCK (0.5 m) FORWARD |
| 14 | TURN ON AIR CONDITIONER IN LIVING ROOM FOR HEATING |
| 15 | TILT CONTROL |
| 16 | PAN CONTROL |
| 17 | SHUTTER |

FUNCTION MANAGING DEVICE, REMOTE CONTROL SYSTEM, METHOD FOR CONTROLLING FUNCTION MANAGING DEVICE, AND RECORDING MEDIUM STORING CONTROL PROGRAM THEREIN

This Nonprovisional application claims priority under 35 U.S.C. §119 on Patent Application No. 2013-047275 filed in Japan on Mar. 8, 2013, the entire contents of which are hereby incorporated by reference.

TECHNICAL FIELD

The present invention relates to a function managing device for operating an appliance, a remote control system, a method for controlling a function managing device, a control program, and a recording medium.

BACKGROUND ART

There has been available on an information processing device a user interface for operating that information processing device or another device. Such a user interface involves a technique for facilitating the operation. An example of such a technique is to selectably display a simple image representative of a function that the device performs. This technique allows the user to understand the details of the function intuitively from the image and select the image to readily call that desired function.

Specific examples of the image include an emblem, a figure, a symbol, a mark, and an illustration. Nowadays, such images in the form of electronic data are called, for example, an icon, a stamp, a label, or a pictogram. The description below representatively uses the term "icon". The term "icon" as used herein, however, does not intend to exclude the other kinds of images listed above.

Patent Literatures 1 to 3, for example, each disclose a technique for further improving users' convenience in the above use of icons. Specifically, Patent Literature 1 discloses an information processing system that allows a user to, when saving input data, select or create an icon to be associated with the data. Patent Literature 2 discloses a document information processing system that readily creates an icon which allows a user to view the contents of a document. Patent Literature 3 discloses a method for generating an icon to be added, the method automatically creating, in saving print settings for a printer driver, an icon to be added to the print settings.

CITATION LIST

Patent Literature 1
Japanese Patent Application Publication, Tokukai, No. 2006-209515 A (Publication Date: Aug. 10, 2006)
Patent Literature 2
Japanese Patent Application Publication, Tokukaihei, No. 11-31062 A (Publication Date: Feb. 2, 1999)
Patent Literature 3
Japanese Patent Application Publication, Tokukai, No. 2006-31347 A (Publication Date: Feb. 2, 2006)

SUMMARY OF INVENTION

Technical Problem

It has been made possible in recent years to remotely control an appliance present at a distant location with use of an information processing device. A user can select an icon displayed on an information processing device as described above, and thus readily call a function of an appliance present at a distant location. Such a capability to readily call a function improves convenience. However, in an emergency (such as when a user has selected an icon by mistake with the result of an unintended function being performed, or when an unintended function is being performed under some circumstances), it should be inconvenient to be unable to readily (as when calling the above function) call a function that is opposite in effect to the unintended function, for example, the function of counteracting the result of the unintended function being performed. In particular, in the case where a user operates an appliance present at a distant location, it should be convenient for the user and allow the user to feel at ease if the user can readily call, in addition to a certain function, another function of counteracting the result of the above function being performed.

The conventional techniques disclosed in Patent Literatures 1 to 3, each of which allows a function to be associated with an icon easily, unfortunately fail to take into consideration a function that is paired with and opposite in effect to the above function. The conventional techniques thus fail to allow the user to readily call a function to the opposite effect, and problematically fail to provide a convenient user interface for a remote operation which user interface the user can use at ease.

The present invention has been accomplished in view of the above problem. It is an object of the present invention to provide (i) a function managing device that provides the user with improved convenience by causing an information processing device to include both an interface for calling a function and another interface for calling a function that is opposite in effect to the above function, (ii) a remote control system, (iii) a method for controlling a function managing device, (iv) a control program, and (v) a recording medium.

Solution to Problem

In order to solve the above problem, a function managing device according to one mode of the present invention is a function managing device for, in a remote control system that causes a controlled appliance to perform a function specified with use of a terminal device, managing the specified function, the remote control system including a function memory section for storing the specified function therein in association with a function that is paired with and opposite in effect to the specified function, the function managing device including: function identifying means for (i) identifying, as a first function to be processed so as to be specifiable with use of the terminal device, a function selected in advance with use of the terminal device, and for (ii) identifying, as a second function to be processed so as to be specifiable with use of the terminal device, a paired function stored in the function memory section in association with the first function; and function enabling means for processing the first and second functions in such a manner that the first and second functions are each specifiable with use of the terminal device.

Advantageous Effects of Invention

One mode of the present invention advantageously provides the user with improved convenience by causing an information processing device to include both an interface for calling a function and another interface for calling a function that is paired with and opposite in effect to the above function.

BRIEF DESCRIPTION OF DRAWINGS

FIG. 3 is a diagram illustrating a specific example of a functions listing table stored in a memory section.

FIG. 4 is a diagram illustrating a specific example of a labels listing table stored in a memory section.

(a) to (c) of FIG. 6 are each a diagram illustrating a specific example of a scenario processed through a function registering process.

Figure 7:
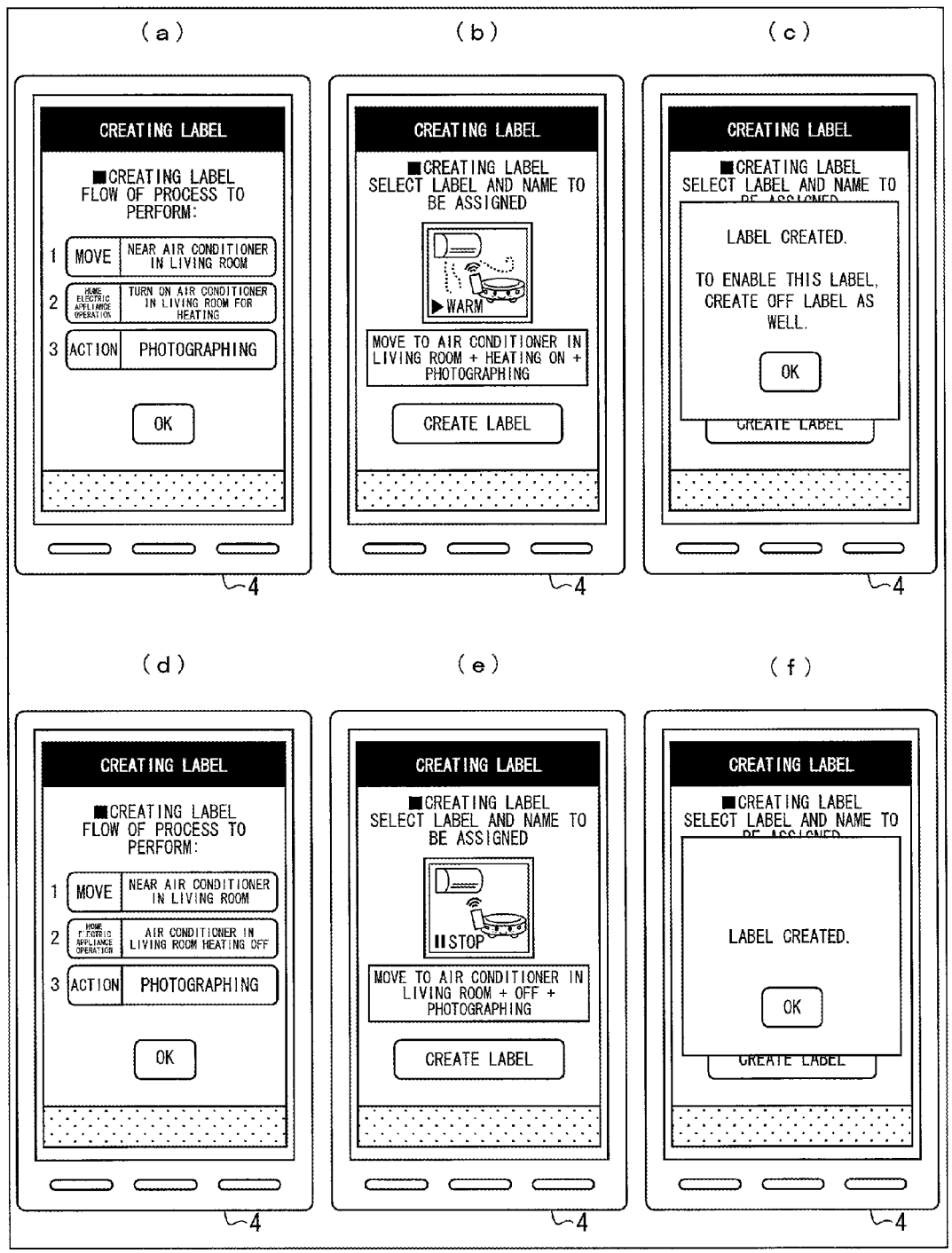

(a) to (f) of FIG. 7 are each a diagram illustrating a specific example of a screen displayed on a portable terminal for function registration in accordance with one embodiment.

FIG. 8 is a diagram illustrating a specific example of a registered scenario DB stored in a memory section.

Figure 9:
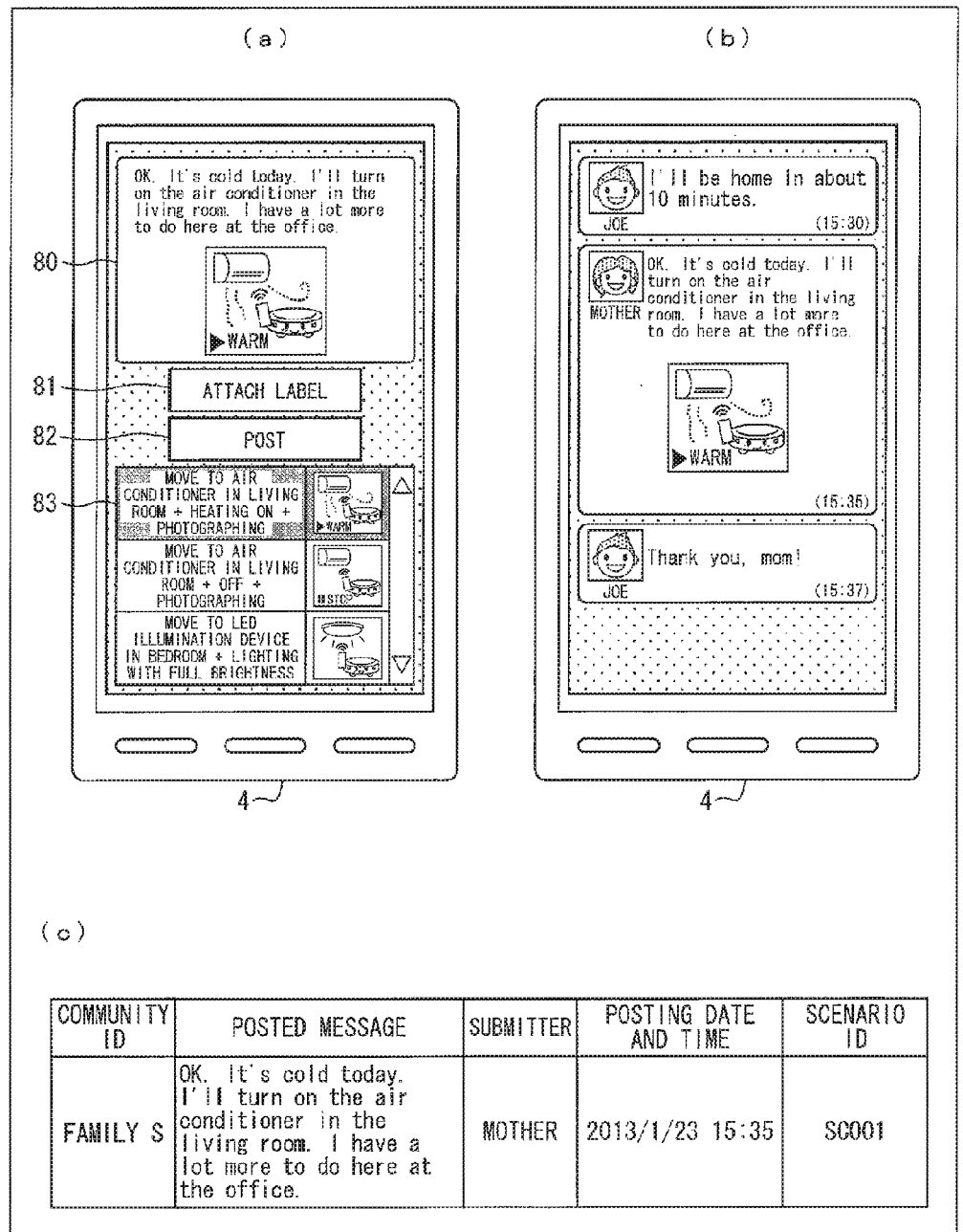

(a) of FIG. 9 is a diagram illustrating an example of a comment editing screen among application screens for a family message board displayed on a portable terminal. (b) of FIG. 9 is a diagram illustrating an example of a screen listing posted comments. (c) of FIG. 9 is a diagram illustrating a specific example of a comment transmitted from a portable terminal to a family message board server when a user has posted a comment with a label attached thereto.

FIG. 10 is a diagram illustrating a specific example of a function module table stored in a memory section.

FIG. 11 is a diagram illustrating a specific example of a function recipe table stored in a memory section.

(a) to (c) of FIG. 12 are each a diagram illustrating a specific example of various data that a function performance instructing section processes.

Figure 13:
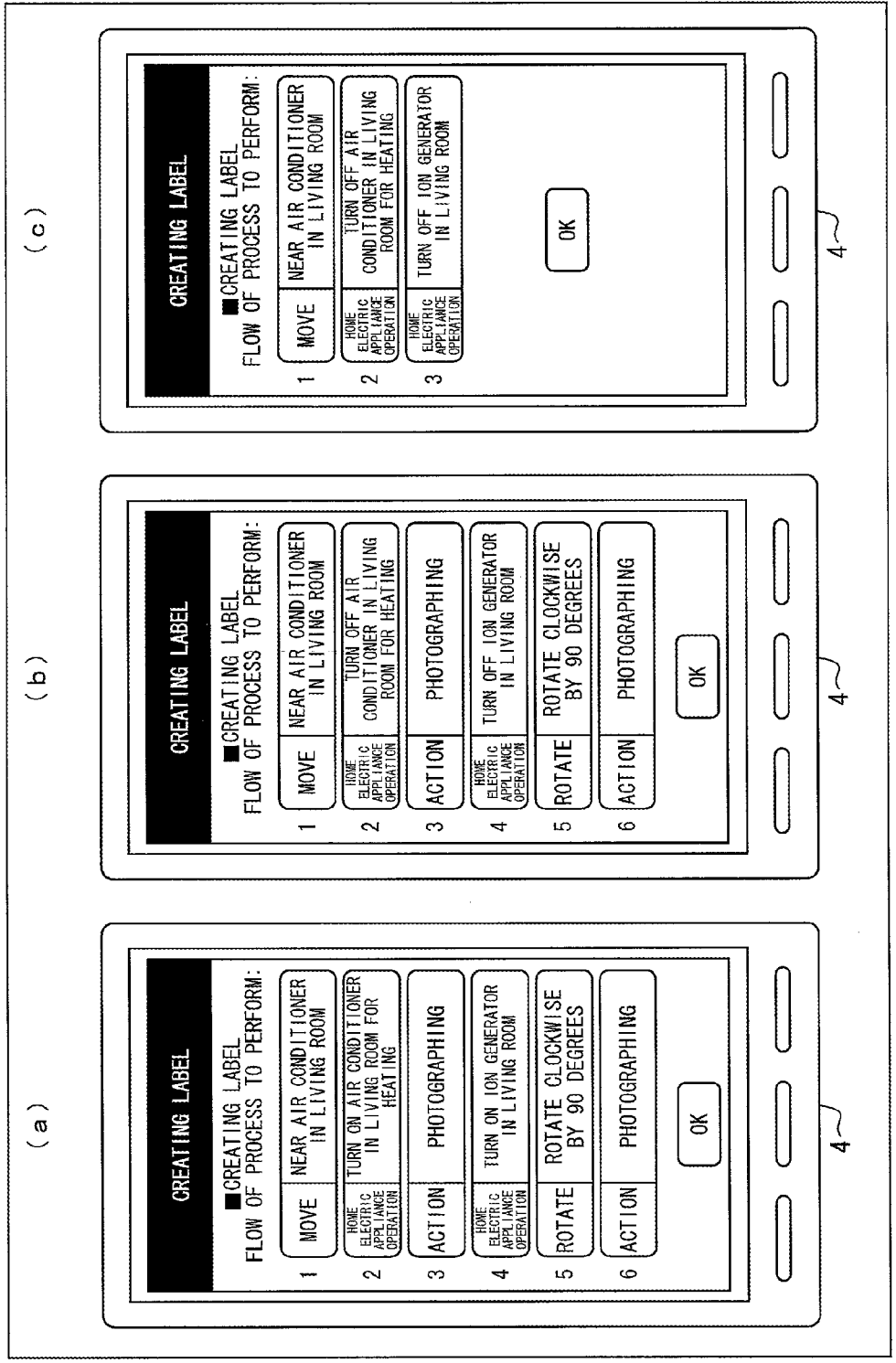

(a) of FIG. 13 is a diagram illustrating an example of a confirmation screen displayed on a portable terminal in the case where a first scenario including a plurality of home electric appliance operation functions has been created. (b) of FIG. 13 is a diagram illustrating a specific example of a confirmation screen displayed on a portable terminal for a second scenario that is opposite in effect to the first scenario. (c) of FIG. 13 is a diagram illustrating another specific example of the confirmation screen for the second scenario.

Figure 14:
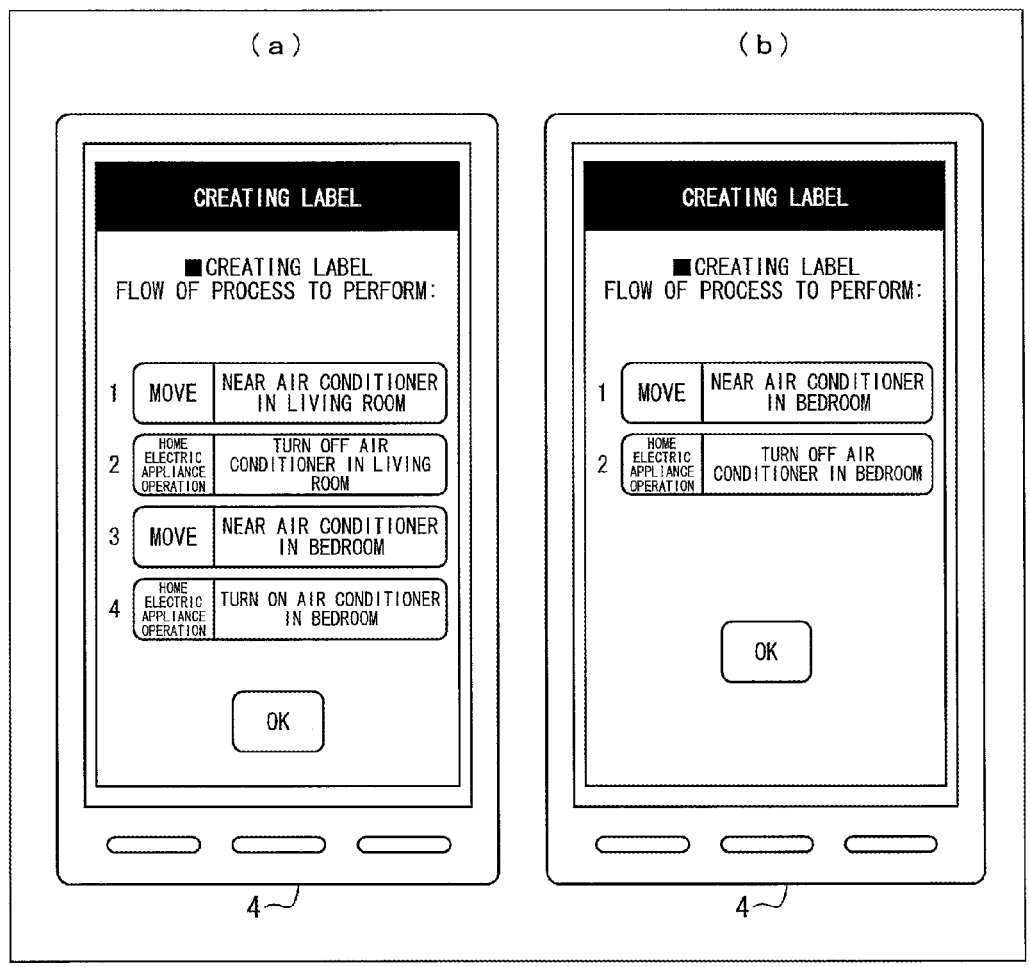

(a) of FIG. 14 is a diagram illustrating a specific example of a confirmation screen displayed on a portable terminal for a first scenario, and (b) of FIG. 14 is a diagram illustrating a specific example of a confirmation screen for a second scenario that is opposite in effect to the first scenario.

Figure 15:
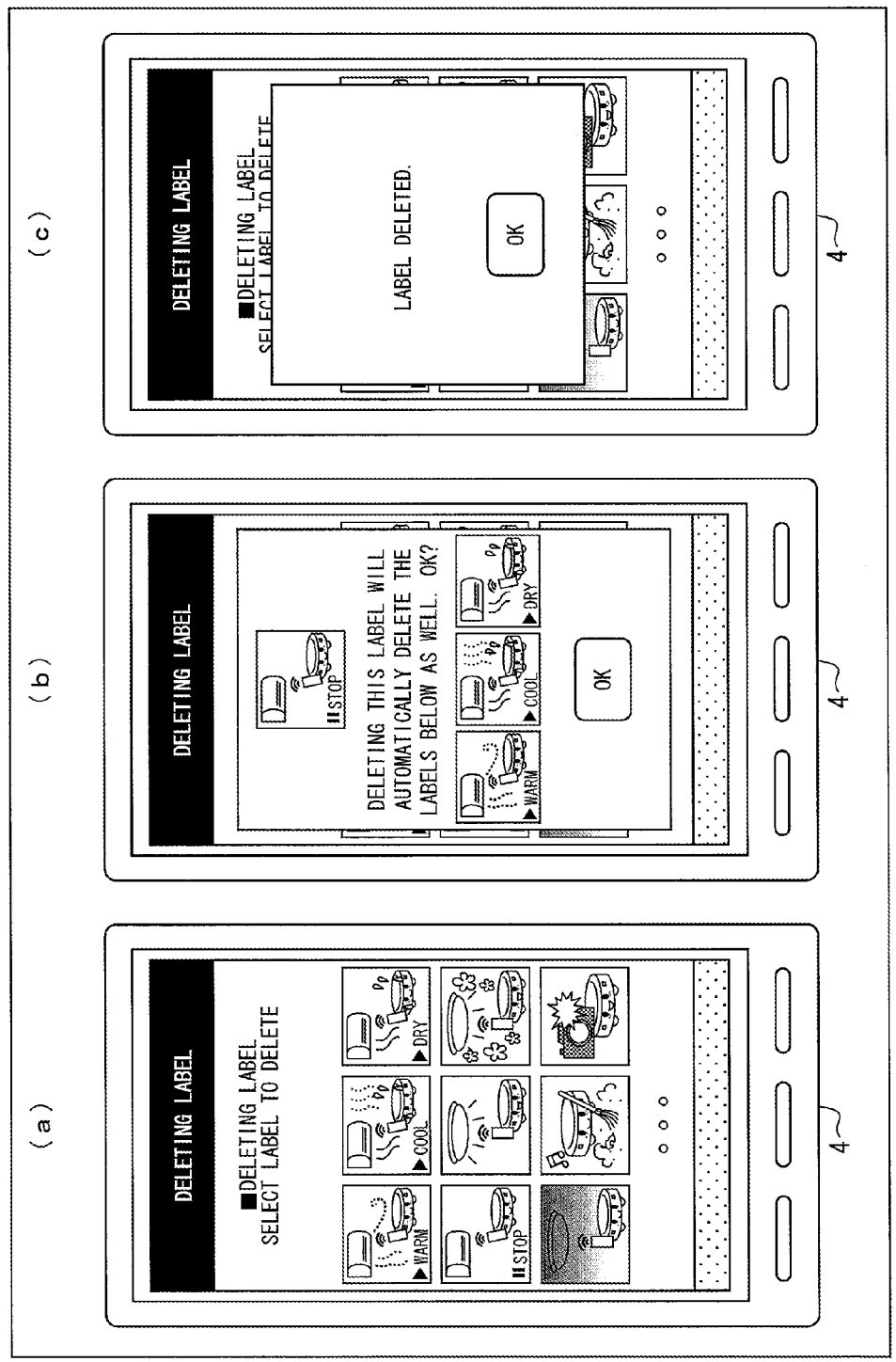

(a) to (c) of FIG. 15 are each a diagram illustrating a specific example of an operation screen displayed on a portable terminal in the case where a label is deleted from a registered scenario DB in accordance with another embodiment.

Figure 16:
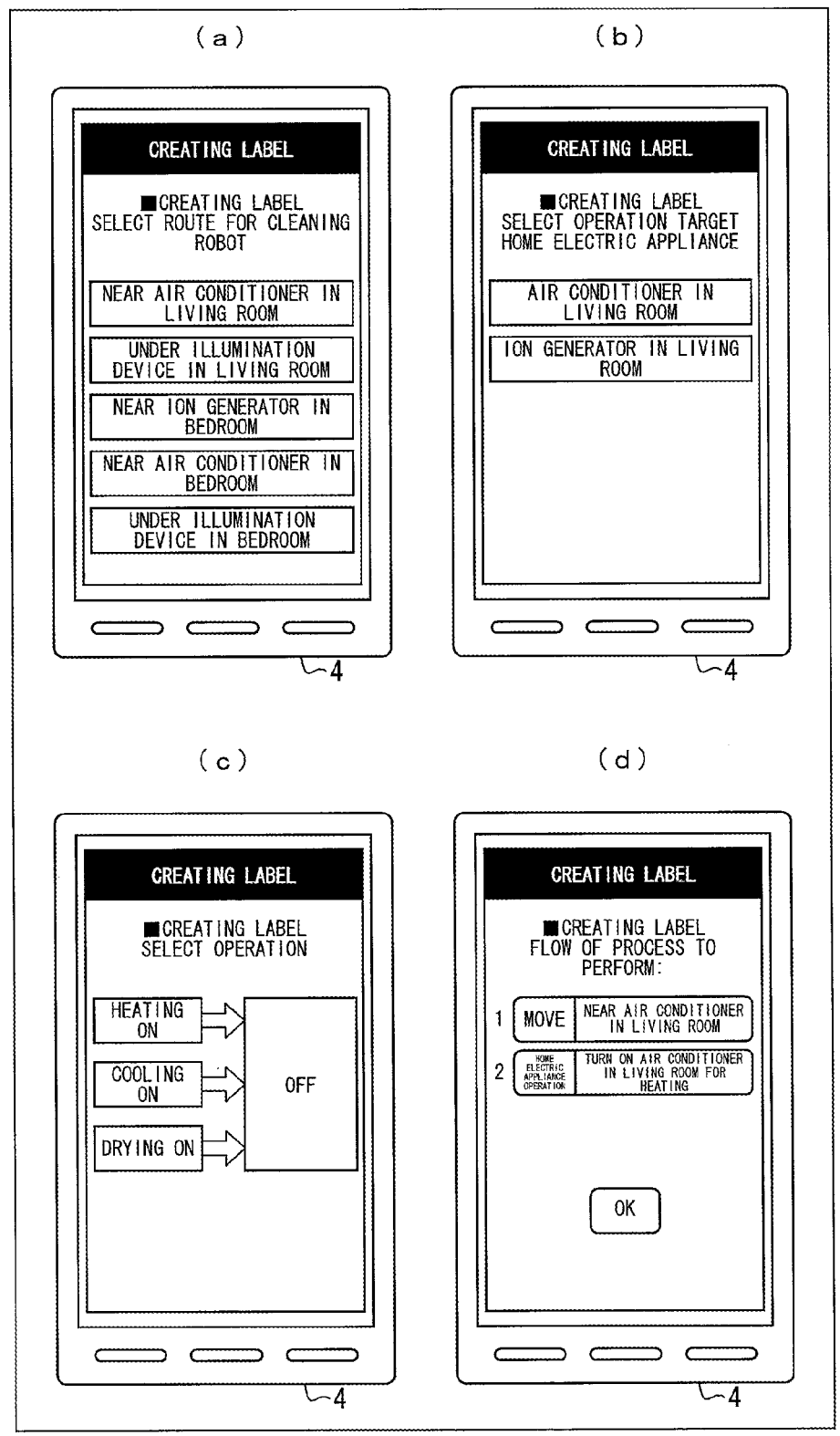

(a) to (d) of FIG. 16 are each a diagram illustrating a specific example of a screen displayed on a portable terminal for function registration in accordance with another embodiment.

Figure 17:
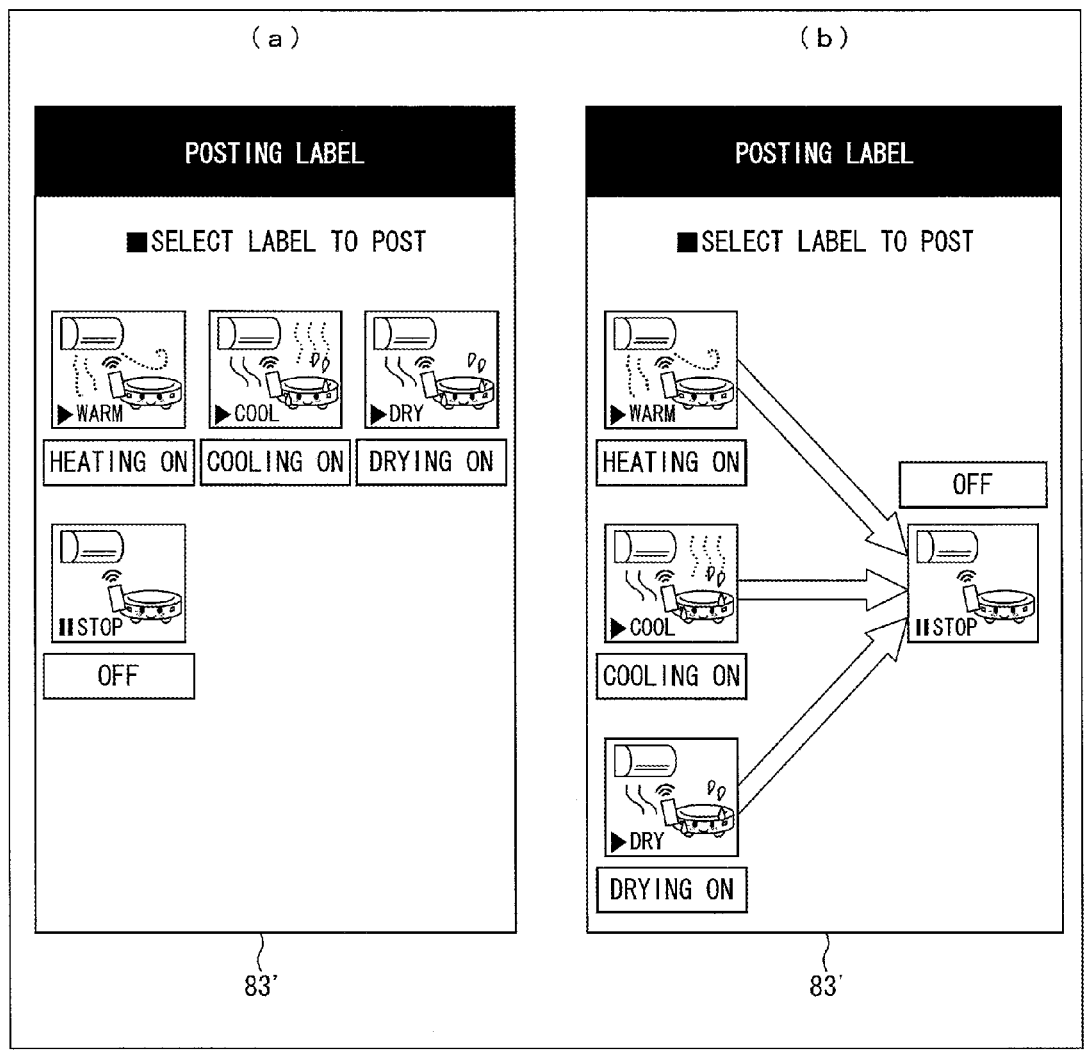

(a) and (b) of FIG. 17 are each a diagram illustrating a specific example of a label palette on a comment editing screen displayed on a portable terminal.

Figure 18:
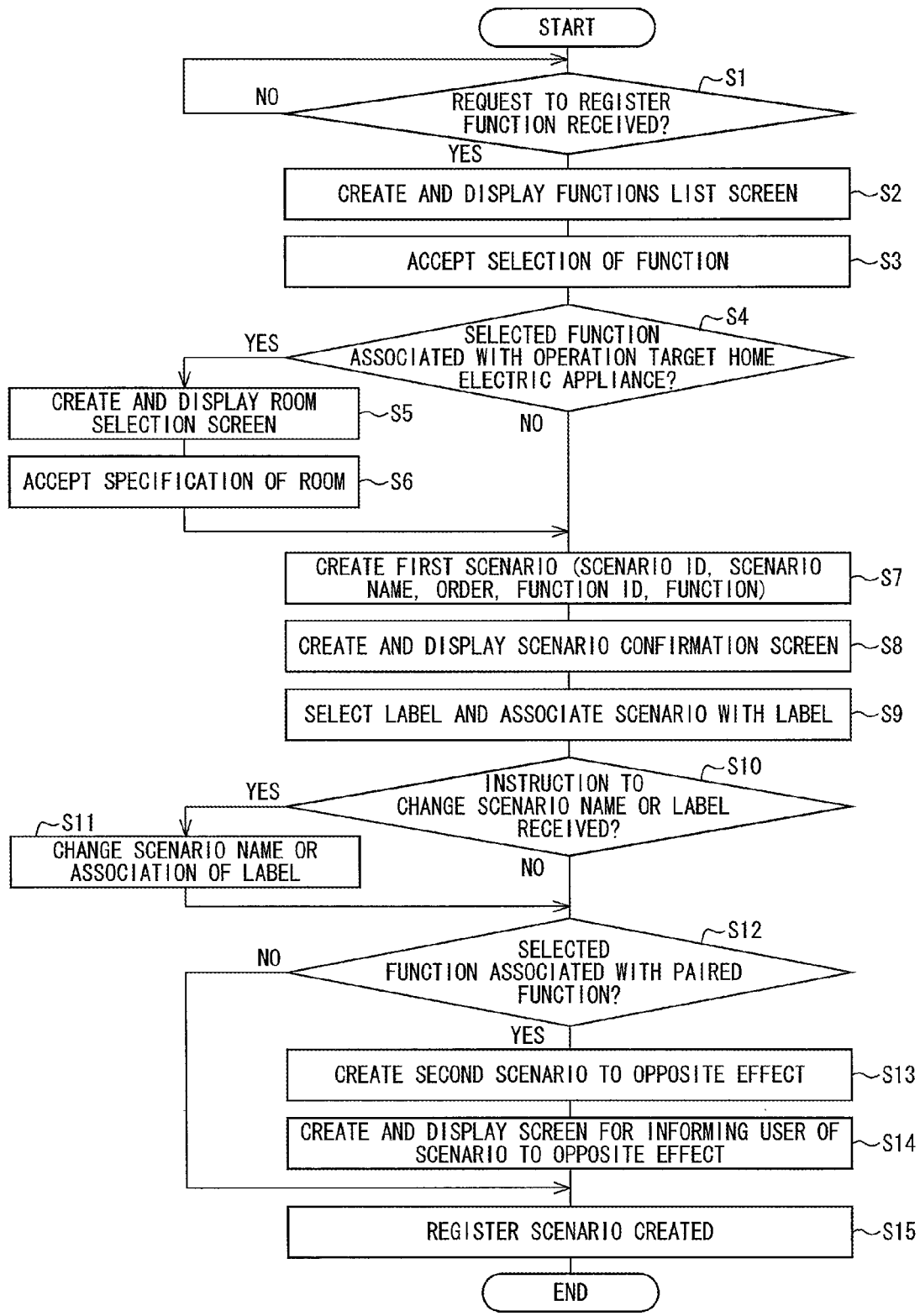

FIG. 18 is a flowchart illustrating a flow of a function registering process performed by a scenario creating section and a function registering section.

DESCRIPTION OF EMBODIMENTS

The embodiments described below each deal with an example of using a function managing device according to the present invention for a remote operation system. This remote operation system is, as an example, a family message board system.

Identical or corresponding members illustrated in the drawings referred to below are assigned an identical reference sign, and are not described repeatedly. Dimensions such as lengths, sizes, and widths and shapes in the drawings are as changed appropriately for clarification and simplification of the drawings, and are not representative of the actual dimensions and shapes.

[Embodiment 1]

The description below deals with Embodiment 1 of the present invention with reference to FIGS. 1 through 12.

[Outline of Family Message Board System]

Figure 2:
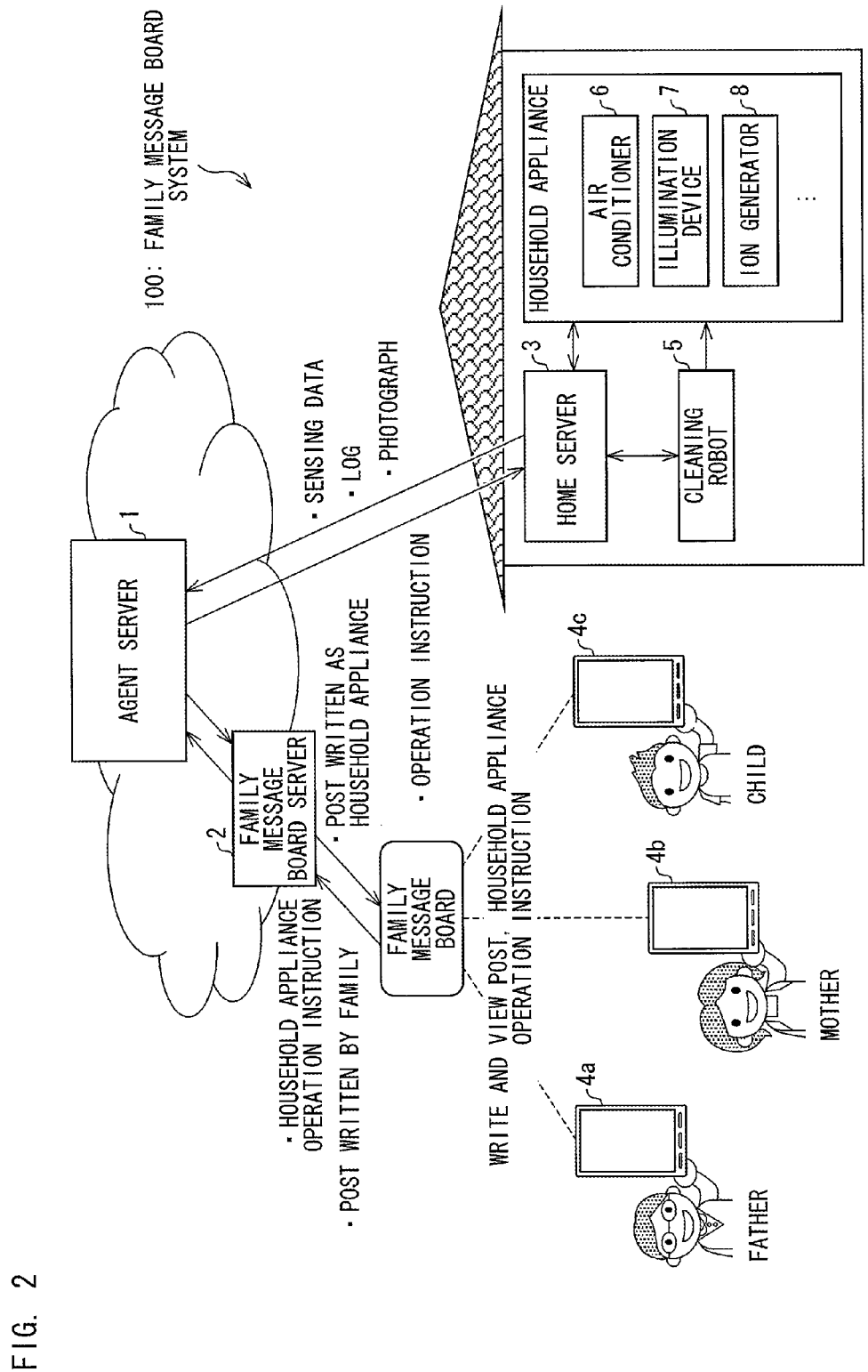
FIG. 2 is a diagram illustrating an outline of a family message board system.

A family message board system of an embodiment of the present invention is outlined below with reference to FIG. 2. FIG. 2 is a diagram illustrating an outline of the family message board system 100 (remote control system).

The family message board system 100, as illustrated in FIG. 2, includes an agent server 1 (function managing device), a family message board server 2 (message board server), and a home server 3. A remote operation system of the present invention includes (i) the above servers included in the family message board system 100, (ii) portable terminals 4 (terminal device) (such as portable terminals 4a, 4b, and 4c) communicably connected to the above servers, and (iii) remote operation target appliances (a cleaning robot 5 and other household appliances) remotely operated by the portable terminals 4.

The family message board system 100 is a system in which a family forms a community via a family message board provided by the family message board server 2 and individual members of the family (for example, the father, the mother, and a child; hereinafter referred to as "users") post their comments with use of their respective portable terminals 4. The family message board system 100 of the present embodiment allows a user to post a comment for an operation of a household appliance (corresponding to "HOUSEHOLD APPLIANCE OPERATION INSTRUCTION" in FIG. 2) onto the family message board to cause the remote operation target appliance to perform a predetermined function in accordance with the comment. The family message board system, in other words, functions as a user interface (UI) through which users (members of a family) remotely operate household appliances.

More specifically, the family message board system 100 is arranged such that the portable terminals 4a, 4b, and 4c held by the users (in the example of FIG. 2, the father, the mother, and the child) access the family message board. This arrangement allows the users to individually use their own portable terminals to post a comment onto the family message board and view such comments on the family message board. The present embodiment, in particular, allows a user to select on a portable terminal 4 an image with which a function of a household appliance is associated in advance and post a comment with that image attached thereto. This arrangement consequently allows the user to easily transmit a household appliance operation instruction to the family message board server 2. The description below uses the term "label" to refer to such an image with which a function can be associated. The term "label" as used herein, however, does not intend to exclude any image other than the kinds of images listed above. Specific examples will be described later of a method for remotely operating an appliance with use of a label.

The family message board server 2, upon acceptance of a comment to which a label is attached, notifies the agent server 1 of a function associated with the label. The agent server 1 then communicates with the home server 3 to instruct the home server 3 to cause the function associated with the label to be performed. This allows a remote operation.

The family message board system 100 may further function as a tool for communication between users. A user may post a comment to another user for a conversation between the users via the family message board.

The function managing device according to the present invention takes the form of the agent server 1 in the family message board system 100 described above. The agent server 1 is an apparatus that, on the basis of a household appliance operation instruction posted on the family message board, supplies a command to a household appliance that is operated inside the house of the family, the command (corresponding to "OPERATION INSTRUCTION" in FIG. 2) being a command to perform the function that the household appliance is instructed to perform. The agent server 1 may include a comment posting section (not shown). The comment posting section can provide, to a household appliance operated inside the house, a pseudo personality as a member of the family, and post a comment onto the family message board for use by the family on behalf of the personified household appliance.

The agent server 1 stores, for each community (family) that uses the family message board service, information on (i) the plan of the house of the family and (ii) household appliances installed in the house. The agent server 1 further stores a list of functions performed by household appliances installed, and can thus present on a user's portable terminal 4 information on what functions can be called through a remote operation. The agent server 1 has the function of converting a household appliance operation instruction accepted from a user's portable terminal 4 via the family message board into a command sequence (corresponding to "OPERATION INSTRUCTION" in FIG. 2) that the home server 3 or household appliance is capable of accepting. The agent server 1 performs this conversion function in correspondence with the plan of the house in which the user lives.

The family message board server 2 performs overall processing related to the family message board such as (i) presenting on the portable terminals 4a, 4b, and 4c a screen displaying the family message board, (ii) presenting a label with which a function that can be called is associated, and (iii) managing posts. The family message board server 2 stores information on, among all functions that the agent server 1 manages, each function that the users of the family message board can call, the function being associated with a label.

The home server 3 centrally controls transmission of information between the cleaning robot 5 or another household appliance and the agent server 1. Specifically, the home server 3 analyzes an operation instruction received from the agent server 1, and controls the operation of the cleaning robot 5 or another household appliance in accordance with the operation instruction. The home server 3 may transmit, to the agent server 1, information obtained from the cleaning robot 5 or information obtained from another household appliance.

The home server 3 is connected to the cleaning robot 5 via a wireless communication, and is connected to the other household appliances each via a wired or wireless communication. The present embodiment discriminates the cleaning robot 5 from the other household appliances, and allows the cleaning robot 5 to directly control the other household appliances. FIG. 2 shows an air conditioner 6, an illumination device 7, and an ion generator 8 as household appliances controlled by the cleaning robot 5. The kinds and number of household appliances are, however, not particularly limited. Examples of the household appliances include, other than the air conditioner 6, the illumination device 7, and the ion generator 8, various home electric appliances such as a television, a videotape recorder, a loudspeaker, a refrigerator, a microwave oven, an air cleaner, a humidifier, and an electric fan.

In the case where the cleaning robot 5 is the only appliance in the house that the agent server 1 is capable of remotely operating, that is, there is no need to centrally control a plurality of household appliances, the family message board system 100 may be arranged such that the home server 3 is omitted and that the cleaning robot 5 directly transmits and receives information to and from the agent server 1.

The portable terminals 4a, 4b, and 4c are each used to view the family message board, write a post, and in particular, provide operation instructions to the cleaning robot 5 and other household appliances. FIG. 2 illustrates an example in which the portable terminals 4a, 4b, and 4c are smart phones. The portable terminals 4a, 4b, and 4c are, however, not limited to smart phones as long as they can be used to view the family message board, write a post, and provide operation instructions. The description below uses the term "portable terminals 4" to collectively refer to the portable terminals 4a, 4b, and 4c in the case where there is no particular need to discriminate among the portable terminals 4a, 4b, and 4c.

The cleaning robot 5 is a self-propelled cleaner that cleans a floor automatically. The cleaning robot 5 has the function of transmitting control signals to household appliances (that is, the air conditioner 6, the illumination device 7, and the ion generator 8 described later) for operation. The cleaning robot 5 includes, as a mechanism for transmitting control signals, a short-range wireless communication mechanism such as infrared radiation or Bluetooth (registered trademark). The cleaning robot 5 has, in addition to the above function, such functions as the function of storing an operation log, the function of detecting and outputting the amount of charge remaining, an image photography function, a speech recognition function, and an audio output function.

The air conditioner 6 is what is called an "air conditioner", and has such air-conditioning functions as cooling, heating, and drying. The illumination device 7 includes a light source such as an LED, and has the function of adjusting brightness, color and/or the like. Specifically, the illumination device 7 of the present embodiment has (i) the function of lighting with the full brightness (that is, lighting with the 100% brightness), (ii) the function of default lighting (that is, lighting with a predetermined brightness to which the light source was set immediately before it was last turned off), (iii) a night-light function (that is, lighting with a night-light brightness and color), (iv) a "double cherry blossom" function (that is, lighting with a particular color), (v) a "someiyoshino cherry blossom" function (that is, lighting with a particular color), and (vi) the function of turning off the light source. The ion generator 8 is an air blower that has the function of generating ions to supply ion-containing air into a room.

As described above, the agent server 1 of the family message board system 100 (i) presents a user, via the family message board server 2, functions that can be performed through a remote operation, (ii) accepts the user's selection of a function, and (iii) controls a household appliance to cause it to perform the selected function.

The agent server 1, which serves as a function managing device according to the present invention, provides a user with both (i) an interface for calling a function and (ii) an interface for calling another function that is paired with and opposite to the above function. The agent server 1, with such an arrangement, allows the user to avoid the inconvenience of being only able to use a single one of a pair of functions (hereinafter referred to as "function pair") that are opposite in effect to each other. The agent server 1, to allow a user to avoid such an inconvenience, includes the feature described below in detail.

The description below deals, as an example function pair, with (i) a first function (herein referred to as "ON-function") of putting an appliance into operation by, for example, turning on the appliance and (ii) a second function (herein referred to as "OFF-function") of counteracting (stopping) the operation of the appliance. The ON-function and the OFF-function are a pair of functions opposite in effect to each other.

[Arrangements of Servers]

Figure 1:
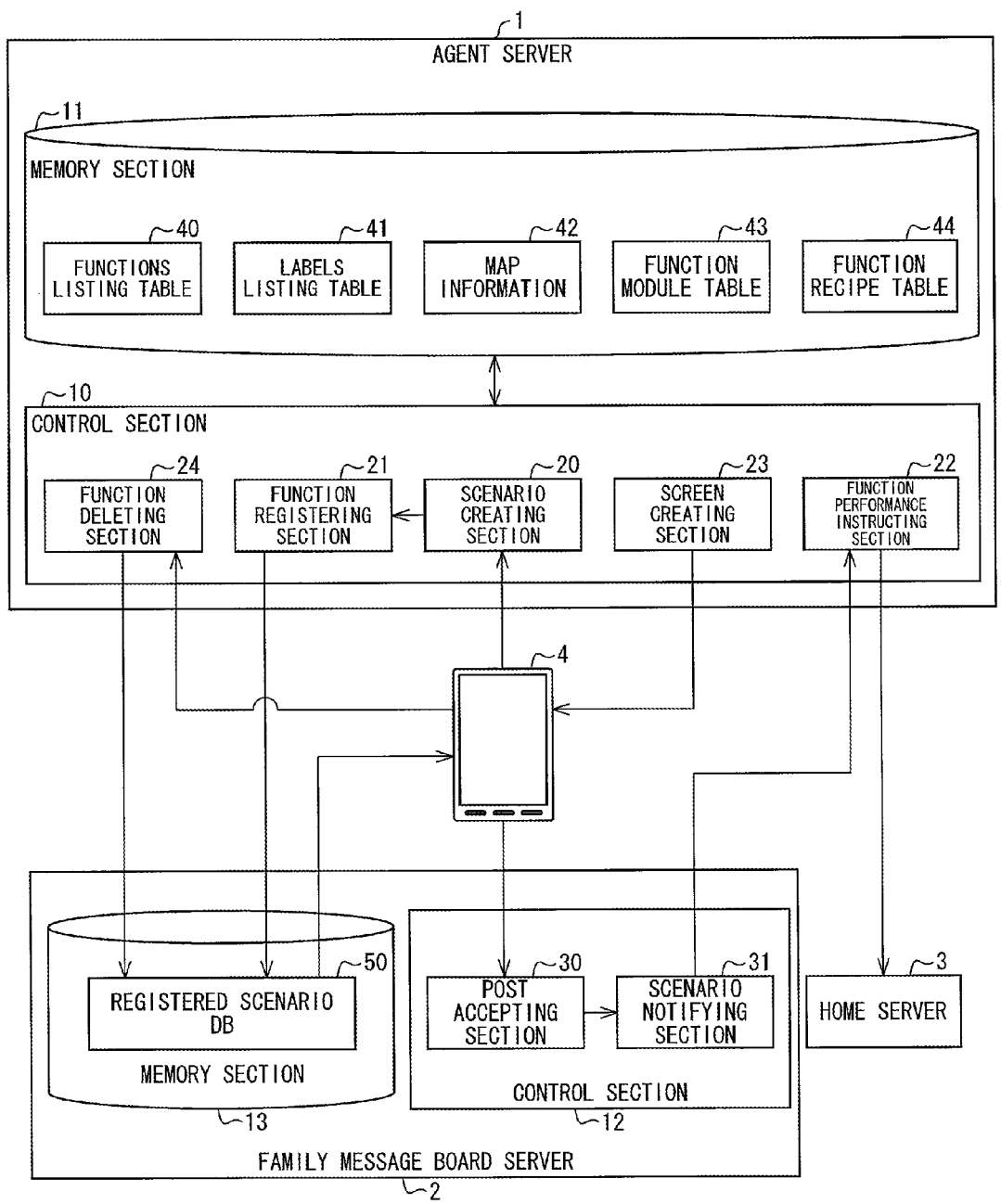
FIG. 1 is a block diagram illustrating respective main parts of an agent server and family message board server of one embodiment of the present invention.

FIG. 1 is a block diagram illustrating respective main parts of the agent server 1 and the family message board server 2.

As illustrated in FIG. 1, the agent server 1 of the present embodiment includes a control section 10 and a memory section 11 (function memory section), whereas the family message board server 2 of the present embodiment includes a control section 12 and a memory section 13 (function information memory section). The agent server 1 and the family message board server 2 each further include a communication section (not shown). The agent server 1 and the family message board server 2 may each further include a display section and input section (not shown) that an operator uses to operate the server.

The communication section (not shown) communicates with an external device over a communication network. The communication section allows the agent server 1, the family message board server 2, the home server 3, and the portable terminals 4 to connect to one another for data transmission.

The memory section 11 and the memory section 13 each non-temporarily store control programs, OS programs, application programs, and various data to be read out for execution of the application programs. The memory sections are each, for example, a memory device such as a read only memory (ROM), a flash memory, an erasable programmable ROM (EPROM), an electrically erasable programmable ROM (registered trademark) (EEPROM), or a hard disc drive (HDD).

The control section 10 and the control section 12 centrally control the individual sections included in the agent server 1 and the family message board server 2, respectively.

The control section 10 included in the agent server 1 of the present embodiment includes, as functional blocks, at least a scenario creating section 20 (function identifying means), a function registering section 21 (function enabling means, function registering means), and a screen creating section 23 (function enabling means, screen generating means). The control section 12 included in the family message board server 2 of the present embodiment includes, as functional blocks, at least a post accepting section 30 and a scenario notifying section 31. The individual functional blocks of the control sections can each be realized by, for example, (i) causing a central processing unit (CPU) or the like to load, to a random access memory (RAM) or the like (not shown), a program stored in a memory section including a read only memory (ROM), a non-volatile random access memory (NVRAM) or the like and (ii) executing that program.

The control section 10 may further include, according to need, a function performance instructing section 22 (function performance instructing means) and a function deleting section (function deleting means) as functional blocks. The functional blocks not described for the present embodiment will be described later for another embodiment.

[Arrangement of Agent Server 1 (Function Registration)]

The family message board system 100 is arranged to allow a user holding a portable terminal 4 to easily call a function of the cleaning robot 5 with use of a label. The agent server 1, to allow a label to be used to call a function, serves to (i) associate a function with a label to be specified by a user and (ii) record information on that correspondence in the memory section 13 of the family message board server 2. The description herein uses such expressions as registering a function to refer to thus recording, in the memory section 13, information on a correspondence between a label and a function to allow a user to post that label. The agent server 1 can, in other words, register a function in response to a user's instruction.

The scenario creating section 20 of the control section 10 combines a plurality of functions with one another in the order in which those functions are performed, and thus creates a collection of functions. The description herein uses the term "scenario" to refer to such a collection of functions. The scenario creating section 20 first selects the function specified by the user to create a first scenario, and then, in the case where the function specified by the user is an ON-function, selects an OFF-function opposite to the ON-function to create a second scenario to the effect opposite to that of the first scenario.

The function registering section 21 (i) associates, with a label, a collection of functions, that is, a scenario created by the scenario creating section 20, and (ii) registers, with the family message board server 2, the scenario associated with the label. The function registering section 21 may by itself select a label suitable for the selected function for associating, or alternatively allow the user to specify a label for associating.

The screen creating section 23 creates an input screen for accepting a user's selection of a desired function and desired label, and provides that input screen to the user's portable terminal 4.

The description below deals in greater detail with functions of the above sections with reference to diagrams each illustrating a structure of data stored in the memory section 11 or memory section 13.

(Functions Listing Table)

FIG. 3 is a diagram illustrating a specific example of a functions listing table 40 (function memory section) stored in the memory section 11. FIG. 3 illustrates a functions list having a data structure in a table form. This is, however, a mere example, and expresses no intention to limit the data structure of the functions list to a table form. A similar principle applies to any other drawing illustrating a data structure.

The functions listing table 40 stores information on functions that a user can call with use of labels. In the present embodiment, it is the cleaning robot 5 that the agent server 1 remotely operates as a target appliance in a direct manner. The functions listing table 40 thus stores information on the functions that the cleaning robot 5 can perform. The cleaning robot 5 has the function of controlling other household appliances (home electric appliance operation function). The functions listing table 40 may thus store information on functions performed in an indirect manner by such other household appliances to be controlled by the cleaning robot 5.

The functions listing table 40 is structured to, for each function, (i) have respective columns for "FUNCTION CATEGORY", "OPERATION TARGET HOME ELECTRIC APPLIANCE", "FUNCTION", and "PAIRED FUNCTION", and (ii) associates a collection of such data with a function ID to allow the collection to be uniquely identified as a single function.

The column "FUNCTION CATEGORY" stores information on categories of the functions that the cleaning robot 5 performs. The function category item "HOME ELECTRIC APPLIANCE OPERATION" indicates a function that the cleaning robot 5 performs to control another household appliance. The function category item "ACTION" indicates a function that the cleaning robot 5 performs by itself with no operation target. The function category item "MOVE" indicates a function that the self-propelled cleaning robot 5 performs to move from a charging stand to an intended location.

The column "OPERATION TARGET HOME ELECTRIC APPLIANCE" stores information on a household appliance as an operation target in the case where the corresponding function category is "HOME ELECTRIC APPLIANCE OPERATION". FIG. 3 shows, for example, the item "AIR CONDITIONER" to refer to the air conditioner 6 in FIG. 2, and the item "LED ILLUMINATION" to refer to the illumination device 7 in FIG. 2.

The column "FUNCTION" stores detailed information on functions that the cleaning robot 5 performs. In the case where the corresponding function category is "HOME ELECTRIC APPLIANCE OPERATION", the column "FUNCTION" stores information on a function that the cleaning robot 5 causes the operation target home electric appliance to perform.

The column "PAIRED FUNCTION", in the case where there exists another function, that is, a paired function opposite in effect to the function of that row, stores the function ID identifying such another function. The column "PAIRED FUNCTION", for example, associates the function of turning on the air conditioner for heating (function ID "F002") with, as its paired function, the function of turning off the air conditioner (function ID "F001").

The present embodiment is arranged such that an ON-function is associated with an OFF-function as its paired function. The scenario creating section 20 refers to the column "PAIRED FUNCTION" in the functions listing table 40 to (i) determine whether the first function selected has its paired function and in the case where the first function has its paired function, (ii) allow a user to have that paired function (second function) as an option in addition to the first function. This arrangement prevents an ON-function from being registered alone as a label. The above arrangement consequently allows the user to avoid a disadvantageous situation in which although the user can use a label to call an ON-function for operation, the user cannot use a label to readily call an OFF-function of counteracting the operation.

(Labels Listing Table)

FIG. 4 is a diagram illustrating a specific example of a labels listing table 41 stored in the memory section 11. The labels listing table 41 stores information on labels with which function collections (scenarios) selected by the scenario creating section 20 can be associated. The labels are preferably each uniquely identified by a label ID. The labels each have a design suggestive of a particular function. The labels are thus preferably each associated in advance with such a particular function as a function that is desirably associated with the label. The labels listing table 41 illustrated in FIG. 4 as an example stores, in the column "ASSOCIATED FUNCTION", information on such functions as are desirably associated with labels.

(Map Information)

Figure 5:
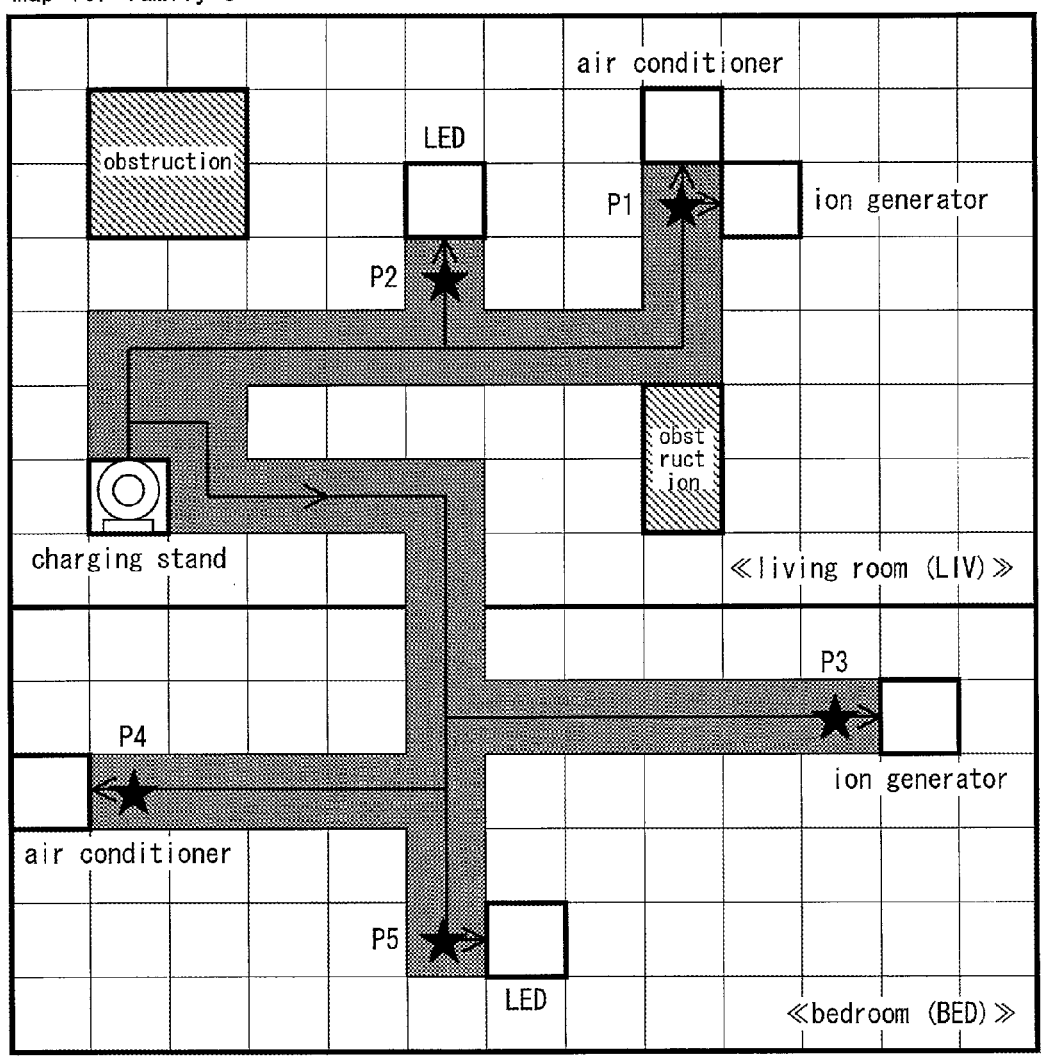
FIG. 5 is a diagram illustrating a specific example of map information stored in a memory section.

FIG. 5 is a diagram illustrating a specific example of map information 42 stored in the memory section 11. The map information 42 indicates, for each family that uses a message board service of the family message board system 100, the plan of the house in which the family lives. The map information 42 of the example illustrated in FIG. 5 includes information on (i) the plan of the house of the family in FIG. 2 (hereinafter referred to as "family S"), (ii) the position of a charging stand at which the cleaning robot 5 is on standby, (iii) the position of each household appliance as a remote operation target, and (iv) the route along which the cleaning robot 5 is to move. Since one of the purposes of storing map information 42 is to store information on the route along which the cleaning robot 5 is to move, the map information 42 may further include, in the case where there is an area in which the cleaning robot 5 cannot travel, information on the position of such an obstruction. Another purpose of storing map information 42 is for the agent server 1 to identify each individual household appliance as a remote operation target for each family. The map information assigns each room of the house with identification information (for example, "LIV" for a living room and "BED" for a bedroom), and further assigns each household appliance with identification information (appliance name). The agent server 1 can thus identify each individual household appliance in a house on the basis of the identification information of the rooms and the appliance names.

The description herein assumes that the route along which the cleaning robot 5 is to move is calculated in advance from (i) the position and orientation of the charging stand and (ii) the position of each household appliance. An external device (not shown) may have such a route calculating function, in which case the agent server 1 simply needs to receive map information 42 from that external device.

(Scenarios)

FIG. 18 is a flowchart illustrating a flow of a function registering process performed by the scenario creating section 20 and function registering section 21. FIG. 6 is a diagram illustrating specific examples of scenarios registered through the function registering process.

The agent server 1 starts a function registering process in response to a request from a portable terminal 4 to register a function (YES in S1). First, the screen creating section 23, in response to the request from the portable terminal 4, (i) provides the portable terminal 4 with a graphical user interface (GUI) screen on which individual functions listed in the functions listing table 40 are displayed in a selectable manner, and (ii) causes the portable terminal 4 to display that screen in its display section (S2).

The user then selects, on the GUI screen displayed on the portable terminal 4, desired functions in the order in which the user wants the functions to be performed. The portable terminal 4 then accepts that selection (S3). The user, for instance, selects the three functions F015, F002, and F014 in that order. The functions F015 and F002 among the three selected functions are each associated with the operation target home electric appliance item "AIR CONDITIONER". In the case where the user has selected a function with which an operation target home electric appliance is associated as above (YES in S4), the screen creating section 23, to uniquely identify the operation target home electric appliance, causes the portable terminal 4 to display a screen for asking the user which room the household appliance that the user wants to operate is installed in (S5). In the case where the user wants to operate the air conditioner in the living room, the user simply needs to specify "LIVING ROOM".

The scenario creating section 20 (i) accepts, via the portable terminal 4, the selection of the three functions (namely F015, F002, and F014) and the specification of the room in which the operation target home electric appliance is installed (that is, the living room) (S6), and thus (ii) creates the scenario illustrated in (a) of FIG. 6 (S7). In the case where the user has selected a function with which an operation target home electric appliance is not associated (NO in S4), the process skips the steps S5 and S6, and jumps to the step S7. Specifically, the scenario creating section 20 creates a scenario by combining the three selected functions with one another in the order in which those functions are to be performed, and assigns the scenario with a scenario ID and a scenario name. The scenario creating section 20 stores, for the scenario, a unique character string in the column "SCENARIO ID" by which the scenario is identifiable. Further, the scenario creating section 20 combines appropriate character strings with one another under a predetermined rule to create a text describing the selected functions in the order in which those functions are to be performed. The scenario creating section 20 stores the created text in the column "SCENARIO NAME" for the scenario. The column "LABEL" will store (i) a label to be selected later by the function registering section 21 or (ii) the label ID of that label.

The scenario creating section 20 stores, for each function, the user's specified order in the column "ORDER". This arrangement makes it clear that the functions F015, F002, and F014 are to be performed in that order.

The scenario creating section 20 stores the function ID of each function in the column "FUNCTION ID". For each function among all selected functions that is associated with an operation target home electric appliance, the scenario creating section 20 stores, in combination with the function ID, the identification information for the room specified by the user. The example above assumes that the user has specified an air conditioner in the living room. The scenario creating section 20 thus combines each of the original function IDs "F015" and "F002" with the identification information "LIV" indicative of the living room to create new function IDs "F015_LIV" and "F002_LIV". This arrangement makes it possible to discriminate between functions for different air conditioners installed in different rooms.

A user may, in the functions listing table 40 in FIG. 3, set in advance an identical kind of appliances in different rooms in such a manner that the user can deal with those appliances as different operation target home electric appliances such as "AIR CONDITIONER IN LIVING ROOM" and "AIR CONDITIONER IN BEDROOM". In such a case, the functions listing table 40 in FIG. 3 sets in advance, for functions each indicated by the function category item "MOVE", different functions for different destinations such as "F915: MOVE TO NEAR AIR CONDITIONER IN LIVING ROOM" and "F916: MOVE TO NEAR AIR CONDITIONER IN BEDROOM". With this arrangement, the user has no need to make two selections, that is, specify a function and specify a destination (room), but can simply make only one selection, that is, specify a function, (for example, F915) to specify a destination (for example, the living room) as well.

The screen creating section 23 may, on the basis of the scenario of (a) of FIG. 6 created by the scenario creating section 20, (i) create a screen (see (a) of FIG. 7) for presenting the user with information on the created scenario to prompt the user to confirm the scenario as the user's desired scenario, and (ii) provide the created screen for the portable terminal 4 (S8).

Next, the function registering section 21 selects, from the labels listing table 41, a single label suitable for the functions (scenario) selected by the scenario creating section 20. In the present embodiment, the scenario creating section 20 has selected, among others, a function of which the function category is "HOME ELECTRIC APPLIANCE OPERATION". The function registering section 21 thus selects a single label with which, among the plurality of functions included in the scenario, the representative function having the function category item "HOME ELECTRIC APPLIANCE OPERATION" is to be associated. In the scenario illustrated in (a) of FIG. 6, "F002: TURN ON AIR CONDITIONER FOR HEATING", among the three functions, is the representative home electric appliance operation function. The function registering section 21 thus (i) selects, from the labels listing table 41 in FIG. 4, the label corresponding to F002 and having the label ID "SE002", and (ii) associates the above scenario with the label selected (S9). (b) of FIG. 6 illustrates the structure of data on the scenario associated with the label by the function registering section 21.

The screen creating section 23 may (i) create a screen (see (b) of FIG. 7) for presenting the user with, as a recommended label and a recommended name, the label selected by the function registering section 21 and the "SCENARIO NAME" assigned by the scenario creating section 20, and (ii) provide the created screen for the portable terminal 4. The user can, if the user does not like those default scenario name and label, replace them with any scenario name and label of the user's choice. Upon receipt of an instruction for such replacement (YES in S10), the scenario creating section 20, in accordance with the replacement instruction, changes the scenario name and label with which the scenario is to be associated (S11). Tapping on the "CREATE LABEL" button creates the scenario illustrated in (b) of FIG. 6.

The scenario creating section 20 of the present embodiment determines, after the scenario creating section 20 creates the scenario (first scenario) illustrated in (a) or (b) of FIG. 6, whether the scenario created includes any function having its paired function (S12). The scenario creating section 20 refers to the functions listing table 40 in FIG. 3, and determines that the function "F002: TURN ON AIR CONDITIONER FOR HEATING" included in the above example scenario is associated with the paired function "F001: TURN OFF AIR CONDITIONER".

In this case (YES in S12), the screen creating section 23 may (i) create a screen (see (c) of FIG. 7) for informing the user that the user needs to also register an OFF-function in order to register the user's desired ON-function, and (ii) provide the created screen for the portable terminal 4. Tapping on the "OK" button creates a scenario that is opposite in effect to the scenario illustrated in (b) of FIG. 6.

The scenario creating section 20 selects the paired function "F001" as described above to create a second scenario opposite in effect to the first scenario (S13). The scenario creating section 20 creates such a scenario opposite in effect under a rule that is not particularly limited. The scenario creating section 20 may, for instance, (i) switch the function "F002", which has its paired function, over to the function "F001" and (ii) keep the rest unchanged from the first scenario. (c) of FIG. 6 illustrates a specific example of a second scenario created by the scenario creating section 20 under the above rule. The function registering section 21, as with the first scenario, associates the second scenario with a label (with the label ID "SE001") corresponding to the representative function "F001".

The screen creating section 23 may, as with the case of the first scenario, provide the portable terminal 4 with screens for registering a label for the second scenario, that is, screens that indicate a process of the registration to guide the user through that registration process (S14) (see (d) through (f) of FIG. 7).

The function registering section 21 transmits, to the family message board server 2, information on the first scenario and second scenario completed as described above, the second scenario being opposite in effect to the first scenario (S15). The two scenarios transmitted are stored in a registered scenario database (DB) 50 (function information memory section) stored in the memory section 13 of the family message board server 2. This completes the function registration. Storing a scenario in the registered scenario DB 50 allows the functions of that scenario to be called with use of labels.

(Registered Scenario DB)

FIG. 8 is a diagram illustrating a specific example of the registered scenario DB 50 stored in the memory section 13 of the family message board server 2.

The scenario creating section 20 and function registering section 21 of the agent server 1 create scenarios, which are then registered one by one as illustrated in FIG. 8. Once a scenario has been registered in the registration scenario DB 50, the user can, with use of the portable terminal 4, read out a label from the registered scenario DB 50 to attach it to a comment that the user is to post. This arrangement allows a user at a distant location to provide, easily with use of a label, an instruction for a household appliance to perform a predetermined function.

As described above, each time a scenario including an ON-function (for example, those identified by the scenario IDs "SC001" and "SC003") is created, the scenario creating section 20 always creates a scenario including an OFF-function (for example, those identified by the scenario IDs "SC002" and "SC004") opposite in effect to the ON-function. There is thus no possibility that a scenario including an ON-function is unpaired as registered in the registered scenario DB 50. The above arrangement allows the user to, readily with use of a label as in the case of calling an ON-function, counteract the result (OFF-function) of the ON-function being performed. The above arrangement can consequently provide the user with a convenient user interface for a remote operation which user interface the user can use at ease.

Note that the functions listing table 40 in FIG. 3 does not associate an OFF-function with a paired function. In the case where, as described above, the user has provided an instruction to create a scenario including an OFF-function, such a scenario may be registered alone (unpaired) in the registered scenario DB 50 (see, for example, the scenario identified by the scenario ID "SC005").

[Arrangements of Agent Server 1 and Family Message Board Server 2 (Remote Operation)]

The family message board system 100 is arranged such that a user holding a portable terminal 4 can attach a label registered in the registered scenario DB 50 to a comment and post the comment onto a family message board to, easily and conveniently from a distant location, provide an instruction to perform the function associated with that label.

The post accepting section 30 included in the control section 12 of the family message board server 2 accepts a comment posted by a user with use of a portable terminal 4. Such a comment accepted by the post accepting section 30 is appended to the family message board for the community to which the user belongs, so that individual users belonging to that community can read the comment on their own portable terminals 4.

The post accepting section 30, in the case where a label is attached to the comment, determines that the user has posted the comment for a household appliance operation instruction, and thus provides the scenario notifying section 31 with the label attached to the comment posted.

(a) of FIG. 9 is a diagram illustrating an example of a comment editing screen among application screens for a family message board displayed on a portable terminal 4. (b) of FIG. 9 is a diagram illustrating an example of a screen listing posted comments.

The user can, when posting a comment onto the family message board, (i) freely edit, in a comment area 80, the message to be posted and then (ii) attach a label to the comment. The user can, for instance, attach a label to a comment readily as follows: The user first taps on a button 81 to call a labels list 83 registered in the registered scenario DB 50, and then reads descriptions for the individual labels to select a desired function. Next, the user drags the label for the desired function into the comment area 80 (see (a) of FIG. 9). The user tapping the POST button 82 allows the comment, to which the label is attached, to be posted from the portable terminal 4 onto the family message board of the family message board server 2. The comment thus posted is processed by a comment processing section (not shown) of the family message board server 2 so as to appear on the family message board. The portable terminal 4 consequently displays the comment as illustrated in (b) of FIG. 9 so that individual users can see the comment and the label together.

(c) of FIG. 9 is a diagram illustrating a specific example of a comment transmitted from a portable terminal 4 to the family message board server 2 when a user has posted a comment with a label attached thereto.

A comment includes information on (i) a community ID, (ii) a posted message, (iii) a submitter, (iv) a posting date and time, and (v) a scenario ID. The community ID is identification that is assigned to each family so that the family message board server 2 manages respective family message boards for individual families. The comment includes, in the "POSTED MESSAGE" column, a text that the user has edited in the comment area 80. The comment includes, in the "SUBMITTER" column, identification information on a comment submitter belonging to the community. The comment may alternatively include information on a unique ID for the portable terminal 4 held by the user. The comment includes, in the "SCENARIO ID" column, information on a scenario ID associated with the label selected by the user from the labels list 83. In the example illustrated in FIG. 9, the user has selected, from the registered scenario DB 50 illustrated in FIG. 8, the label for the scenario having the scenario ID "SC001". The portable terminal 4 thus stores "SC001" in the "SCENARIO ID" column of the comment as illustrated in (c) of FIG. 9, and transmits the comment to the family message board server 2.

The post accepting section 30, upon acceptance of the comment of (c) of FIG. 9, provides the scenario notifying section 31 with information on the scenario ID "SC001" included in the "SCENARIO ID" column.

The scenario notifying section 31 (i) identifies the individual functions in the scenario in the specified order on the basis of the scenario ID of the scenario associated with the label attached to the comment posted, and (ii) notifies the function performance instructing section 22 of the agent server 1 of the identified functions and the order.

In the case where, for instance, the user has posted a comment to which a label is attached that is associated with the scenario identified by the scenario ID "SC001", the scenario notifying section 31 (i) refers to the registered scenario DB 50 to identify the respective function IDs of the three functions associated with the scenario ID "SC001" and the order of the three functions (for example, NO. 1: F015_LIV, NO. 2: F002_LIV, and NO. 3: F014), and (ii) notifies the function performance instructing section 22 of the respective function IDs of the three functions and their order.

The function performance instructing section 22 included in the control section 10 of the agent server 1 instructs the cleaning robot 5 to perform the functions of the scenario associated with the label attached to the comment posted. Specifically, the function performance instructing section 22 refers to various data described later (shown in FIGS. 10 and 11) to create a command sequence for causing the cleaning robot 5 to perform, in the specified order, the functions of the scenario associated with the label attached to the comment posted.

(Function Module Table and Function Recipe Table)

FIG. 10 is a diagram illustrating a specific example of a function module table 43 stored in the memory section 11.

A single function corresponds to (i) a single action performed as a minimum unit by the cleaning robot 5 or to (ii) a combination of such actions. A description of a single action that the cleaning robot 5 is to be instructed to perform is a statement. A collection of such statements is a command sequence.

The function module table 43 in FIG. 10 stores information on function modules, that is, minimum units of operation that the cleaning robot 5 is to be instructed to perform. Combining one or more function modules forms a single function. For instance, combining, in an appropriate order and in appropriate numbers, the function modules identified by the module IDs "FM1" to "FM3" forms a single move function of moving from a charging stand to a predetermined spot.

The agent server 1 may create a move function with reference to the map information 42 and the function module table 43 every time the function performance instructing section 22 creates a command sequence. The agent server 1 should, however, preferably create in advance respective move functions for different intended locations to avoid bearing a processing load and simplify the arrangement. The present embodiment, for such a purpose, (i) creates in advance, for each intended location, a function recipe indicative of what forms the function, that is, how to combine which function modules in what order to form the function, and (ii) allows the agent server 1 to read out a function recipe instantly according to need.

FIG. 11 is a diagram illustrating a specific example of the function recipe table 44 stored in the memory section 11.

The function recipe table 44 stores information on a function recipe for each function as illustrated in FIG. 11. A certain type of function in the functions listing table 40 in FIG. 3 (for example, "F015: MOVE TO NEAR AIR CONDITIONER") involves different combinations of function modules depending on which room in which house the air conditioner corresponding to the intended location is in. The function recipe table 44 thus uniquely identifies each function on the basis of (i) a community ID identifying a house, (ii) a room ID identifying a room, and (iii) a function ID. The function recipe table 44 may, to identify a function (such as "F014: PHOTOGRAPH") that is common to all houses and rooms, store only information on a function ID.

To create, for instance, a recipe for a "F015: MOVE TO NEAR AIR CONDITIONER" function for the air conditioner in the living room of the family S, the agent server 1 simply needs to refer to the map information 42 as illustrated in FIG. 5 and combine, among the function modules listed in the function module table 43 in FIG. 10, (i) two "FM1" function modules, (ii) one "FM2" function module, (iii) seven "FM1" function modules, (iv) one "FM3" function module, and (v) two "FM1" function modules. The function recipe table 44 consequently stores a function recipe indicative of the above combination in association with "FAMILY S", "LIV" (living room), and "F015" as illustrated in FIG. 11.

The function module table 43 and the function recipe table 44 are not necessarily stored in the memory section 11 of the agent server 1. Alternatively, an external device (not shown) may, for instance, store map information 42 and a function module table 43, and create and manage a function recipe table 44. The agent server 1, in such a case, simply needs to be capable of accessing that external device to refer to the function recipe table 44 according to need.

In the above case, only such a capability to refer to the function recipe table 44 is necessary for the function performance instructing section 22 to easily obtain a function recipe for a desired function and quickly create a command sequence.

(Command Sequence)

FIG. 12 is a diagram illustrating a specific example of various data that the function performance instructing section 22 processes.

In the case where a user has posted a comment with a label attached thereto, the scenario notifying section 31 of the family message board server 2 notifies the function performance instructing section 22 of the function IDs and order (illustrated in (a) of FIG. 12 as examples) both identified by the label. The scenario notifying section 31 also notifies the function performance instructing section 22 that the submitter of the comment with the label attached thereto is a member of the community "FAMILY S" (not shown).

The function performance instructing section 22, with reference to (i) function IDs (to be more specific, function IDs and room IDs) illustrated in (a) of FIG. 12 and (ii) a community ID that the function performance instructing section 22 has been notified of separately, extracts the corresponding function recipe from the function recipe table 44 of FIG. 11. (b) of FIG. 12 illustrates an example of intermediate data generated from the information of (a) of FIG. 12 as a result of the function performance instructing section 22 extracting a function recipe.

Finally, the function performance instructing section 22 develops the intermediate data, indicative of the function recipe, into individual statements arranged in the specified order and links the statements together to create a command sequence. (c) of FIG. 12 illustrates an example of a command sequence that the function performance instructing section 22 has created by developing the intermediate data illustrated in (b) of FIG. 12.

The function performance instructing section 22 transmits the command sequence, which it has created as described above, to the cleaning robot 5 via the home server 3. The cleaning robot 5 in response executes, in the specified order, the individual commands included in the command sequence. This arrangement makes it possible to operate the cleaning robot 5 under the scenario associated with the label that the user has specified (that is, move to near the air conditioner, turn on the air conditioner for heating, and take a photograph).

The family message board system 100 of the present embodiment, as described above, allows a user to (i) easily call, with use of a single label, a scenario including a complex combination of function modules and functions and thus (ii) instruct the cleaning robot 5 to perform the scenario.

To prevent an ON-function label from being used alone, the agent server (function managing device) 1 of the present embodiment, every time a label with which an ON-function is associated has been registered, registers a label with which the corresponding OFF-function is associated. This arrangement allows the user to avoid a disadvantageous situation in which although the user uses a label to call an ON-function for operation, the user cannot readily use a label to call an OFF-function of counteracting the operation.

With an OFF-function of a heating appliance or the like being constantly available as paired with an ON-function, a user can call the OFF-function immediately in the case where the user has turned on the heating appliance by mistake. The above arrangement is thus not only convenient, but also advantageous in that the users can use the family message board system 100 as a remote operation system at ease.

The family message board and the registration scenario DB 50 of FIG. 8 are created for each family (community). Thus, the users belonging to a family can share a label with each other that any individual user has registered and use it in posting a comment. Further, labels posted on the family message board can be seen by any member of the community via the family message board as illustrated in FIG. 9. This arrangement achieves the following advantage: In the case where, for instance, a child (Joe) has turned on an electric appliance by mistake, an adult (mother or father) can easily turn it off with use of a label to the opposite effect. The above arrangement, which allows family members to, as described above, share an OFF-function registered as paired with an ON-function, further improves safety.

The family message board system 100 of the present invention allows the agent server 1 to be notified via the home server 3 of information such as information on a photograph taken by the cleaning robot 5 and information on a temperature measured of a room. The agent server 1 allows such information obtained on a house to be posted onto a family message board as a comment from a character of a personification of the cleaning robot 5. The agent server 1 thus allows a user to confirm by a photograph or comment posted that the cleaning robot 5 has performed the functions that the user has instructed the cleaning robot 5 to perform. The agent server 1 allows a user to confirm, for instance, that (i) the cleaning robot 5 has turned off a heating appliance in the house and that (ii) the temperature of the room has decreased. The agent server 1, as described above, allows a user at a distant location to check the operation of a household appliance, and consequently allows the user to use the family message board system 100 as a remote operation system at greater ease.

[Embodiment 2]

The agent server 1 of Embodiment 2, in response to a user's request, allows a single scenario to include a plurality of functions each having the function category item "HOME ELECTRIC APPLIANCE OPERATION". Further, the agent server 1 can create a scenario that is opposite in effect to such a scenario including a plurality of home electric appliance operation functions.

(a) of FIG. 13 is a diagram illustrating an example of a confirmation screen displayed on a portable terminal 4 in the case where the scenario creating section 20 has created a scenario including a plurality of home electric appliance operation functions. The example illustrated in (a) of FIG. 13 assumes that the scenario creating section 20 of the agent server 1 has created the scenario below in accordance with a user's instruction.

First, the scenario instructs the cleaning robot 5 to move from a charging stand (see FIG. 5) to near the air conditioner in the living room (move function: F015). Next, the scenario instructs the cleaning robot 5 to transmit, to the air conditioner in the living room, a control signal for turning on the air conditioner for heating (home electric appliance operation function: F002). Then, the scenario instructs the cleaning robot 5 to photograph the spot (air conditioner) (action: F014). Next, the scenario instructs the cleaning robot 5 to transmit, to the ion generator in the living room, a control signal for turning on the ion generator (home electric appliance operation function: F012). Then, the scenario instructs the cleaning robot 5 to rotate clockwise by 90 degrees (rotate function: F018). Finally, the scenario instructs the cleaning robot 5 to photograph the spot (ion generator) (action: F014). The function registering section 21 assigns, by a method similar to that described in Embodiment 1, a single label to a single scenario including the above functions of the cleaning robot 5, and registers the scenario. The present embodiment involves a scenario including a plurality of home electric appliance operation functions. The function registering section 21 may thus (i) select, as a representative function, the home electric appliance operation function to be performed first through the scenario and (ii) associate the scenario with the label associated with the representative function. Alternatively, the function registering section 21 may (i) select, as a representative function, the home electric appliance operation function performed last through the scenario and (ii) associate the scenario with the label associated with the representative function. Further alternatively, the present embodiment may be arranged such that a user registers in advance, in the labels listing table 41 of FIG. 4, a label for a plurality of home electric appliance operation functions (in particular, ON-functions) and that the function registering section 21, in the case where the scenario creating section 20 has created a scenario including the plurality of ON-functions, associates the scenario with that label.

The scenario creating section 20, as in Embodiment 1, determines whether the above scenario created first (first scenario) includes any function having its paired function, and in the case where the first scenario includes a function having its paired function, creates a second scenario that is opposite in effect to the first scenario.

In FIG. 3, the above example scenario includes (i) the home electric appliance operation function F002, which is associated with its paired function F001, and (ii) the home electric appliance operation function F012, which is associated with its paired function F011. The scenario creating section 20 thus creates a second scenario that includes the paired functions F001 and F011 instead of the home electric appliance operation functions F002 and F012. The screen creating section 23 may (i) create a screen for informing the user of a second scenario having been created to the opposite effect and of what the second scenario includes, and (ii) provide the portable terminal 4 with the screen created (see (b) of FIG. 13).

As described above, the agent server 1 of the present embodiment, even in the case where a user has registered a scenario including a plurality of home electric appliance operation functions, automatically creates another scenario that is opposite in effect to the above scenario. Specifically, in the case where a user has created a label with which a scenario including one or more ON-functions is associated, the agent server 1 of the present embodiment automatically creates a label with which a scenario including OFF-functions that are opposite in effect to the respective ON-functions is associated. This arrangement allows the user to avoid a situation in which an ON-function can undesirably be performed alone.

[Embodiment 3]

The scenario creating section 20 of Embodiment 3 may, in the case where it creates a second scenario that is opposite in effect to a first scenario, omit from the second scenario any function, among a plurality of functions included in the first scenario, that can be omitted depending on the function category.

In the first scenario illustrated in (a) of FIG. 13, the home electric appliance operation functions numbered "2" and "4" are each associated with its paired function. Further, performing those home electric appliance operation functions requires a move function of moving to near the operation target home electric appliance.

In view of the above points, the scenario creating section 20 may, to create a second scenario, (i) keep any function paired with a home electric appliance operation function included in a first scenario and any move function and (ii) omit functions in the other categories (for example, "ACTION" and "ROTATION"). The present embodiment is arranged such that while the functions in the function category "ROTATION" are each an independent function prepared in advance for use in combination with a function related to the orientation of the cleaning robot 5 such as the "PHOTOGRAPH" function, the functions in the function category "MOVE" include, as part of a move function, a sub-function with which the cleaning robot 5 rotates (change of direction) in order to arrive at an intended location (control a home electric appliance). The description below uses expressions such as "change of direction" to refer to the cleaning robot 5 rotating as part of a move function, and thus discriminates such rotation from the above independent functions in the function category "ROTATION". The scenario creating section 20 may thus omit a "ROTATION" function together with a function such as the "PHOTOGRAPH" function, but never omits a "DIRECTION CHANGE" sub-function included in a "MOVE" function not omitted and thus remaining. In the case where the cleaning robot 5 controls home electric appliances with use of communication means having directivity such as infrared radiation, "DIRECTION CHANGE" functions are needed to control (in particular, turn off) the home electric appliances. A "MOVE" function that is not to be omitted may include only a "DIRECTION CHANGE" sub-function.

(c) of FIG. 13 illustrates a specific example of a second scenario created in Embodiment 3 which second scenario is opposite in effect to the first scenario illustrated in (a) of FIG. 13.

The agent server 1 of the present embodiment automatically creates a scenario including an OFF-function and a label associated with that scenario, from which scenario functions other than an ON-function or OFF-function have been omitted. This arrangement allows the user to avoid a situation in which an ON-function can undesirably be performed alone. In addition, the agent server 1 of the present embodiment, which omits functions other than an OFF-function from a second scenario, creates a second scenario that allows the OFF-function as a main purpose to be performed more rapidly. This arrangement allows a user to call, with use of a label, a scenario including an OFF-function of rapidly counteracting the result of an ON-function being performed. The above arrangement consequently allows the user to use the family message board system 100 as a remote operation system at greater ease.

[Embodiment 4]

The scenario creating section 20 of Embodiment 4, in the case of creating a second scenario that is opposite in effect to a first scenario, preferably (i) keeps any function of which the paired function is an OFF-function and (ii) omits any function of which the paired function is an ON-function.

The present embodiment assumes that the scenario creating section 20 has created, for example, the first scenario illustrated in (a) of FIG. 14. The home electric appliance operation function numbered "2" (F001) is not associated with any paired function as illustrated in FIG. 3. Even if the home electric appliance operation function numbered "2" is associated with a paired function, it will be associated with an ON-function as its paired function since the "F001" function is an OFF-function. The home electric appliance operation function numbered "4" (F002) is associated with the F001 function (OFF-function).

The scenario creating section 20 determines that it does not need to attempt to include, in a second scenario that is opposite in effect to the first scenario, a function paired with the home electric appliance operation function numbered "2" (OFF-function F001) since it is not associated with any paired function. Even if the above OFF-function is associated with its paired function (ON-function), the scenario creating section 20 will (i) determine that it does not need to aggressively include such an ON-function in a second scenario to the opposite effect, and (ii) omit including that paired function in the second scenario. The scenario creating section 20 further determines that it also does not need to include the move function numbered "1" in the second scenario because this move function was only needed for the home electric appliance operation function numbered "2", which the scenario creating section 20 will omit including in the second scenario. The scenario creating section 20 thus omits including the move function numbered "1" as well.

The scenario creating section 20, in other words, reverses the functions of a first scenario in creating a second scenario that is opposite in effect to the first scenario created first. Specifically, the scenario creating section 20 replaces any function having its paired function with that paired function. The scenario creating section 20 thus (i) keeps any OFF-function as a paired function and any move function needed for the OFF-function and (ii) omits any ON-function, any move function needed for the ON-function, and any function unrelated to an ON-function or OFF-function.

As described above, the scenario creating section 20 of Embodiment 4 creates, as a second scenario for counteracting the result of a first scenario being performed, a scenario for rapidly performing only an OFF-function illustrated in (b) of FIG. 14, and registers a label for that scenario. This arrangement allows the user to avoid a situation in which an ON-function can undesirably be performed alone. In addition, the scenario creating section 20 omits not only unrelated functions but also ON-functions and move functions related to the ON-functions. This arrangement allows an OFF-function to be performed more rapidly and safely.

[Embodiment 5]

The agent server 1 of Embodiment 5 can delete a registered label (scenario) in response to a user's request. The agent server 1 manages functions on the basis of the arrangement below in such a manner that deletion of a scenario does not leave only an unpaired scenario that is opposite in effect to the deleted scenario to consequently leave an ON-function alone.

The control section 10 included in the agent server 1 of Embodiment 5 differs from those of Embodiments 1 through 4 in that it further includes a function deleting section 24.

The function deleting section 24 deletes a scenario registered in the registered scenario DB 50. Specifically, the function deleting section 24 deregisters a label stored availably in the registered scenario DB 50 to make it impossible to call the scenario (that is, a collection of one or more functions) associated with that label.

The function deleting section 24 deletes the scenario associated with a specified label to be deleted from the registered scenario DB 50 in response to a user's request. A user may, for instance, access the agent server 1 with use of a portable terminal 4 to specify an unnecessary label and instruct the agent server 1 to delete that label (see (a) of FIG. 15).

The description below assumes that, for instance, the agent server 1 has received from a portable terminal 4 a request to delete, from the registered scenario DB 50 illustrated in FIG. 8, the label associated with the scenario identified by the scenario ID "SC004".

The function deleting section 24, in response to the above request, deletes from the registered scenario DB 50 the scenario identified by the scenario ID "SC004".

The function deleting section 24 of the present embodiment, after it has deleted a specified scenario (first scenario) or identified such a scenario to be deleted, determines whether there exists a second scenario that is opposite in effect to the first scenario deleted or to be deleted. The function deleting section 24, in other words, determines whether the registered scenario DB 50 includes, registered therein, another function of which the paired function is included in the first scenario targeted for deletion.

In the above example, the scenario identified by the scenario ID "SC004" includes the OFF-function F005, which is associated with each of the ON-functions F006 through F010 as its paired function in the functions listing table 40 of FIG. 3. Deleting from the registered scenario DB 50 the scenario identified by the scenario ID "SC004" may unfortunately let any of the ON-functions F006 through F010 be left in the registered scenario DB 50 alone (unpaired) with no registered paired function (OFF-function F005).

The function deleting section 24, to prevent such a situation, additionally deletes any scenario including any of the ON-functions F006 through F010 which scenario is opposite in effect to the OFF-function F005 included in the scenario targeted for deletion. In the example illustrated in FIG. 8, the function deleting section 24, in deleting the scenario identified by the scenario ID "SC004", additionally deletes from the registered scenario DB 50 the scenario identified by the scenario ID "SC003", the scenario being opposite in effect to the scenario identified by the scenario ID "SC004".

With the above arrangement, in the case where a user deletes a label for an OFF-function, the function deleting section 24 additionally deletes a label for an ON-function of performing the operation that is counteracted by the OFF-function. This arrangement allows the user to avoid a situation in which an ON-function can undesirably be performed alone.

The screen creating section 23 may create a screen for (i) presenting the user with a list of labels with each of which a scenario identified by the function deleting section 24 for deletion is associated and thus (ii) allowing the user to confirm that the function deleting section 24 will delete such scenarios as well, and provide the portable terminal 4 with the screen created (see (b) and (c) of FIG. 15).

[Embodiment 6]

The above embodiments are each arranged such that causing the cleaning robot 5 to perform a predetermined home electric appliance operation requires a user to select from the functions listing table 40 a correct combination of (i) a path along which the cleaning robot 5 is to move and (ii) a home electric appliance operation function to perform. Simply presenting a user with the functions listing table 40 unfortunately does not allow the user to easily find a correct combination. This may problematically prevent the user from creating a scenario appropriately or make the user feel burdened with the necessity to perform a complicated operation to create a scenario.

To solve the above problem, the agent server 1 of Embodiment 6 provides a convenient user interface that allows the user to register a label more readily.

The agent server 1 of the present embodiment, on the basis of the map information 42 illustrated in FIG. 5, stores information on, in association with each other, (i) each spot (indicated by stars in FIG. 5) at which the cleaning robot 5 can operate an operation target home electric appliance and (ii) the operation target home electric appliance that the cleaning robot 5 can operate at that spot.

In the case where the agent server 1 has accepted a request from a portable terminal 4 to register a function, the screen creating section 23 first provides the portable terminal 4 with a screen that allows the user to specify a route along which the cleaning robot 5 is to move (intended location) (see (a) of FIG. 16). The screen illustrated in (a) of FIG. 16 simply needs to list route options corresponding to the respective spots (P1 through P5) each defined in the map information 42 as a location at which the cleaning robot 5 can operate a home electric appliance.

Once the user has specified one of the spots (P1 through P5), the screen creating section 23 next provides the portable terminal 4 with a screen for allowing the user to specify, from among all operation target home electric appliances that the cleaning robot 5 can operate when it is at the specified spot, an operation target home electric appliance that the user wants to operate (see (b) of FIG. 16). In the case where, for instance, the user has specified the spot P1 (near the air conditioner in the living room), which is associated with the air conditioner in the living room and the ion generator in the living room, the screen creating section 23 provides the portable terminal 4 with a screen displaying options for those home electric appliances.

Once the user has specified an operation target home electric appliance, the screen creating section 23 provides the portable terminal 4 with a screen displaying options for functions that the cleaning robot 5 can instruct the specified operation target home electric appliance to perform (see (c) of FIG. 16). This arrangement allows the user to specify a function that the user wants the operation target home electric appliance to perform. The screen creating section 23 preferably provides, as the above screen displaying options for functions, a screen with which it is visually easily understandable for the user that three ON-functions are associated with one OFF-function as a paired function.

In the case where the user specifies (i) a route along which the cleaning robot 5 is to move (from a charging stand to an intended location), (ii) an operation target home electric appliance, and (iii) a function as described above, the scenario creating section 20 can read out from the functions listing table 40 necessary functions (namely, move functions and home electric appliance operation functions) and create a scenario on the basis of a correct combination. The screen creating section 23 may provide the portable terminal 4 with a screen that allows the user to confirm the scenario created (see (d) of FIG. 16). With the above arrangement, the user simply needs to select, on screens displayed one after another, options to specify a function that the user wants to call. The user can consequently create a scenario readily without having to think about a correct combination.

After the scenario creating section 20 has created a scenario as illustrated in (d) of FIG. 16, the process goes similarly to those of the above embodiments: A scenario name and label are specified for the scenario created (see (b) of FIG. 7), and the function registering section 21 registers the completed scenario in the registered scenario DB 50.

The present embodiment is arranged similarly to the above embodiments such that (i) the scenario creating section 20, in the case where a user registers a scenario (first scenario) including an ON-function, additionally creates a second scenario including an OFF-function, the second scenario being opposite in effect to the first scenario, and that (ii) the function registering section 21 registers the two scenarios together. This arrangement allows the user to avoid a situation in which an ON-function can undesirably be performed alone.

[Embodiment 7]

Embodiments 1 through 6 above are each arranged such that (i) the registered scenario DB 50 includes, registered therein for each ON-function, an OFF-function of counteracting the result of the ON-function being performed, and that (ii) a user can call either of the ON-function and OFF-function with use of a label.

There is, however, the possibility of only an ON-function being left alone (unpaired) in the registered scenario DB 50 as a result of an error. The family message board system 100 should, even in such a case, avoid a situation in which although a user has performed an ON-function, the user cannot call the corresponding OFF-function. Alternatively, the family message board system 100 should preferably, even without the arrangements described for Embodiments 1 through 6, avoid a situation in which an ON-function can undesirably be performed alone.

To solve the above problem, Embodiment 7 provides a family message board system 100 that, in the case where a user has posted a comment with a label attached thereto that is associated with an ON-function, disables the ON-function associated with that label unless a label for the corresponding OFF-function is available.

The present embodiment is arranged such that the function performance instructing section 22 serves to disable functions. Specifically, in the case where a user has posted onto a family message board a comment with a label attached thereto, the scenario notifying section 31 notifies the function performance instructing section 22 of the scenario (first scenario) associated with that label. The function performance instructing section 22 then accesses the registered scenario DB 50 via a communication section (not shown) to check whether the registered scenario DB 50 includes, registered therein, a scenario (second scenario) that is opposite in effect to the first scenario of which the function performance instructing section 22 has been notified. The function performance instructing section 22, in other words, searches the registered scenario DB 50 for a second scenario including an OFF-function of counteracting the result of the ON-function being performed, the ON-function being included in the first scenario. The function performance instructing section 22, in the case where it has determined that the registered scenario DB 50 includes the second scenario registered therein, creates a command sequence to instruct the home server 3 to perform the functions included in the first scenario as in Embodiment 1. The function performance instructing section 22, in the case where it did not find the second scenario in the registered scenario DB 50, discontinues creating a command sequence and informs the family message board server 2 that the function performance instructing section 22 will not perform the first scenario.

With the above arrangement, even in the case where a user has posted a comment with a label attached thereto that is associated with an ON-function, the function performance instructing section 22 can cause the cleaning robot 5 to not perform the above ON-function unless the labels listing table 41 includes a label available for the corresponding OFF-function of counteracting the result of the ON-function being performed. This arrangement makes it possible to avoid a situation in which although a user has performed an ON-function, the user cannot call the corresponding OFF-function. The above arrangement is thus advantageous in that the user can use the family message board system 100 as a remote operation system at ease.

In the case where the agent server 1 has determined that the registered scenario DB 50 does not include, registered therein, an OFF-function corresponding to a registered ON-function, the comment posting section (not shown) of the agent server 1 may, in the guise of a character of a personification of the cleaning robot 5, post onto the family message board of the family message board server 2 a comment that prompts the user to register a label for the corresponding OFF-function (for example, "Create a label in advance for turning off the air conditioner if you want to turn it on with a label!"). This arrangement allows the user to avoid a situation in which an ON-function can undesirably be performed alone.

[Embodiment 8]

Embodiment 8 may be arranged such that the scenario notifying section 31 of the family message board server 2 serves to disable functions. With this arrangement, in the case where a user has posted onto the family message board a comment with a label attached thereto that is associated with a scenario (first scenario), the scenario notifying section 31 refers to the registered scenario DB 50 to check whether the registered scenario DB 50 includes, registered therein, a second scenario that is opposite in effect to the first scenario associated with the label attached to the comment posted. The scenario notifying section 31, in the case where it has determined that the registered scenario DB 50 includes such a second scenario registered therein, notifies the function performance instructing section 22 of the agent server 1 of the called first scenario as in Embodiment 1. The scenario notifying section 31, in the case where it did not find the second scenario in the registered scenario DB 50, discontinues notifying the function performance instructing section 22 of the first scenario. The scenario notifying section 31 may, instead of discontinuing the notification of the first scenario, inform the comment posting section (not shown) of the agent server 1 that the registered scenario DB 50 does not include, registered therein, a scenario that is opposite in effect to the first scenario associated with the label attached to the comment posted. With this arrangement, the comment posting section can, as in Embodiment 7, post onto the family message board of the family message board server 2 a comment that prompts the user to register a label for the corresponding OFF-function.

[Embodiment 9]

The above embodiments are each arranged such that the agent server 1 associates a plurality of functions with a single label. This arrangement allows a user to readily call a series of functions with use of a label. Embodiment 9 is, in contrast, arranged such that the agent server 1 stores a functions listing table 40 in which a single home electric appliance operation function is associated with a single label. With this arrangement, selecting a label causes the agent server 1 to (i) identify the home electric appliance operation function associated with that label and any move function necessary for that home electric appliance operation function and (ii) instruct the home server 3 to perform those functions.

The above arrangement thus eliminates the need for the successive processes of (i) prompting a user to select a label and a function to be associated with that label and (ii) registering that label. Further, the family message board server 2 does not need to include a registered scenario DB 50.

In Embodiment 9, which has the above arrangement, the screen creating section 23 of the agent server 1 provides the family message board server 2 with a screen for presenting the user with a pair of labels, namely a label for an ON-function and a label for the corresponding OFF-function, in such a manner as to allow the user to select either of the two labels. The family message board server 2 in turn causes the portable terminal 4 to display the screen provided. This arrangement allows the user to use either of the two labels.

The screen creating section 23 of the present embodiment creates, instead of the labels list 83, a label palette to be displayed on the comment posting screen illustrated in FIG. 9.

(a) and (b) of FIG. 17 are each a specific example of a label palette 83' on a comment posting screen displayed on a portable terminal 4. The agent server 1 accepts, from a user's portable terminal 4, (i) information that specifies an operation target home electric appliance and (ii) a request to call labels related to that home electric appliance. In the case where, for instance, the user has specified the air conditioner in the living room, the screen creating section 23 reads out from the functions listing table 40 (i) functions related to the air conditioner and (ii) labels with which the respective functions are associated, and thus creates a label palette 83'. The screen creating section 23 includes, on the label palette 83', labels for respective ON-functions and a label for an OFF-function of counteracting the result of any of the ON-functions being performed (see, for example, (a) of FIG.

17). The screen creating section 23 preferably creates a screen that, as illustrated in (b) of FIG. 17, presents functions in such a manner as to allow the user to understand which function is paired with which function.

The user can, as illustrated in (a) and (b) of FIG. 17, operate the label palette 83' on the portable terminal 4 to attach not only a label for an ON-function, but also a label for the corresponding OFF-function to a comment to be posted. The user can, in other words, readily call not only an ON-function, but also the corresponding OFF-function. This arrangement allows the user to avoid a situation in which an ON-function can undesirably be performed alone.

As another example of the label palette, in the case where, for instance, a user has specified the television in the kitchen, the screen creating section 23 reads out from the functions listing table 40 functions related to the television and labels with which the respective functions are associated, and thus creates a label palette for displaying those labels. Specifically, the screen creating section 23 places, on the label palette, (i) a label for the function of turning up the volume of the television (first function) and (ii) a label for its paired function, that is, the function of turning down the volume of the television (second function), and thus causes the portable terminal 4 to display those labels in such a manner as to allow the user to select either of the two labels.

[Embodiment 10: Software Implementation Example]

Control blocks of the agent server 1 (particularly, the scenario creating section 20, the function registering section 21, the function performance instructing section 22, the screen creating section 23, and the function deleting section 24) and control blocks of the family message board server 2 (particularly, the post accepting section 30 and the scenario notifying section 31) may be realized by a logic circuit (hardware) provided in an integrated circuit (IC chip) or the like, or may be realized by software as executed by a central processing unit (CPU).

In the latter case, the agent server 1 and the family message board server 2 each include: a CPU that executes instructions of a program that is software realizing the foregoing functions; a read only memory (ROM) or storage device (each referred to as "storage medium") storing the program and various kinds of data in such a form that they are readable by a computer (or a CPU); and a random access memory (RAM) that develops the program in executable form. The object of the present invention can be achieved by a computer (or a CPU) reading and executing the program stored in the storage medium. The storage medium may be "a non-transitory tangible medium" such as a tape, a disk, a card, a semiconductor memory, and a programmable logic circuit. Further, the program may be supplied to or made available to the computer via any transmission medium (such as a communication network and a broadcast wave) which enables transmission of the program. Note that the present invention can also be implemented by the program in the form of a computer data signal embedded in a carrier wave which is embodied by electronic transmission.

The above embodiments are each arranged to manage functions by associating one or more ON-functions with a single OFF-function as a paired function in order to prevent an ON-function from being used alone. The above embodiments are, however, not limited to such an arrangement. In a situation where, for example, the present invention is applied to a life support system and priority is thus placed on an ON-function over the corresponding OFF-function for safety's sake, the above embodiments may each include a functions listing table 40 in which functions are paired with each other in association with each other in such a manner as to conversely prevent an OFF-function from being used alone. Further, the first function and second function are not limited to an ON-function and OFF-function, respectively. The present invention is suitably applicable to any situation where the first function is, rather than being managed so that the first function is available alone, preferably managed together with the second function so that the first function and second function are both available.

[Recap]

In order to solve the above problem, a function managing device according to mode 1 of the present invention is a function managing device for, in a remote control system that causes a controlled appliance to perform a function specified with use of a terminal device, managing the specified function, the remote control system including a function memory section for storing the specified function therein in association with a function that is paired with and opposite in effect to the specified function, the function managing device including: function identifying means for (i) identifying, as a first function to be processed so as to be specifiable with use of the terminal device, a function selected in advance with use of the terminal device, and for (ii) identifying, as a second function to be processed so as to be specifiable with use of the terminal device, a paired function stored in the function memory section in association with the first function; and function enabling means for processing the first and second functions in such a manner that the first and second functions are each specifiable with use of the terminal device.

With the above arrangement, the function identifying means can, in the case where a user has selected only a first function with use of a terminal device, identify, as a processing target, not only the first function but also a second function opposite in effect to the first function. The function enabling means can thus process the first function, selected with use of the terminal device, in such a manner that the first function is specifiable, and can also process the second function to the opposite effect in such a manner that the second function is specifiable.

With the above arrangement, the function managing device, even in the case where a user has selected only a first function, processes a pair of the first function and a second function, opposite in effect to the first function, in such a manner that the first and second functions are specifiable. The above arrangement thus allows the terminal device to specify not only the first function but also the second function to cause a controlled appliance to perform the first and second functions. The user of the terminal device can, in consequence, simply select a first function to make available not only the first function but also a second function to the opposite effect. The above arrangement, as a result, advantageously improves convenience.

The function managing device according to mode 2 of the present invention is based on the above mode 1, and may be arranged such that the remote control system further includes a function information memory section for storing information on the specified function in a state where the terminal device is capable of reading out and specifying the information on the specified function; and the function enabling means is function registering means for registering, in the function information memory section, information on the first and second functions to process the first and second functions in the manner.

The above arrangement allows the user to specify, with use of the terminal device, information stored in the function information memory section and to thus specify a function that the user wants the controlled appliance to perform. The function registering means registers, in the function information memory section, not only information on the first function selected by the user of the terminal device, but also information on the second function opposite in effect to the first function.

The above arrangement allows the user to avoid a situation in which the first function alone is undesirably specifiable while the second function, opposite in effect to the first function, is not specifiable. The above arrangement consequently allows the user to avoid a disadvantageous situation in which although the user has instructed the first function to be performed, the user cannot specify the second function to counteract the result of the first function being performed.

The function managing device according to mode 3 of the present invention is based on the above mode 2, and may be arranged such that the information on the specified function is an image with which one or more functions are associated; and the function registering means registers information on the first and second functions, each associated with a predetermined image, in the function information memory section to process the first and second functions in the manner.

The above arrangement allows the user to select an image suggestive of a function with use of the terminal device to easily specify a function that the user wants the controlled appliance to perform. The above arrangement consequently improves convenience that the user enjoys in specifying a function.

The function managing device according to mode 4 of the present invention is based on the above mode 3, and may be arranged such that the function identifying means (i) identifies, as a first function group, a plurality of functions selected in advance with use of the terminal device and (ii) identifies, as a second function group, a plurality of functions that are paired with and opposite in effect to the respective functions of the first function group; and the function registering means registers, in the function information memory section, information on the first and second function groups each associated with a predetermined image.

The above arrangement allows the function registering means to, even in the case of handling a plurality of functions, register, in the function information memory section, both a first function group and a second function group opposite in effect to the first function group. Further, the above arrangement, which associates a plurality of functions with a single image, allows the user to simply select a single image to specify at once all the plurality of functions associated with that image. The above arrangement, in consequence, further improves convenience that the user enjoys in specifying a function.

The function managing device according to mode 5 of the present invention is based on the above mode 4, and may be arranged such that the first function group further includes a third function that is independent and that is not associated with a paired function; and the function identifying means excludes the third function from the second function group, or such that the first function group includes a third function that is performed in combination with (i) a function included in the first function group and (ii) a paired function associated with the function included in the first function group; and the function identifying means identifies the third function as a function of the second function group.

The above arrangement allows (i) the first function group, selected by the user, to be registered as associated with an image and (ii) the second function group, opposite in effect to the first function group, to be registered similarly. The second function group, at the registration, does not include the same number of functions as the number of functions included in the first function group: The function identifying means identifies the second function group so that the second function group includes only any function that is paired with a function included in the first function group. In other words, the function registering means excludes any third function that is not oppositely related to any function included in the first function group, and thus registers a second function group meaningful as a function group opposite in effect to the first function group. The above arrangement consequently allows the user to specify a second function group that more rapidly counteracts the result of the first function group being performed.

The function managing device according to mode 6 of the present invention is based on any one of the above modes 2 to 5, and may preferably further include function deleting means for, in response to a request from the terminal device, deleting, from the function information memory section, information on a function specified in the request, wherein: the function deleting means, in a case where the function specified in the request for deletion is the second function and the function information memory section stores, registered therein, the information on the first function associated with the second function as the paired function, deletes the information on the first function together with the information on the second function.

The above arrangement allows the function deleting means to, in deleting information on the second function registered in the function information memory section, also delete information on the first function stored as the paired function of the second function. The above arrangement thus allows the user to avoid a situation in which the first function remains alone (unpaired) in the function information memory section. The above arrangement consequently allows the user to avoid a disadvantageous situation in which although the user has instructed the first function to be performed, the user cannot specify the second function to counteract the result of the first function being performed.

The function managing device according to mode 7 of the present invention is based on the above mode 6, and may preferably be arranged such that the function memory section stores, as the paired function, a single kind of the second function in association with a plurality of kinds of the first function; and the function deleting means (i) deletes, together with information on the single kind of the second function, information on any first function corresponding to the single kind of the second function specified for deletion, and (ii) in a case where one of the plurality of kinds of the first function has been specified for deletion and the function information memory section stores, registered therein, information on any other first function of the plurality of kinds of the first function, does not delete the information on the single kind of the second function.

The above arrangement allows the function memory section to store, in association with a plurality of first functions, a single paired function (second function). The function deleting means, upon receipt of an instruction to delete information on the second function from the function information memory section, also deletes information on any first function of which the paired function is the second function. In contrast, the function deleting means, upon receipt of an instruction to delete one of the first functions, does not delete information on the associated second function. This is because deleting the associated second function will undesirably leave the other first functions alone (unpaired) in the function information memory section. The above arrangement, which allows the user to, as described above, avoid a situation in which the first function remains alone (unpaired) in the function information memory section, consequently allows the user to avoid a disadvantageous situation in which the user cannot specify the second function to counteract the result of a first function being performed.

The function managing device according to mode 8 of the present invention is based on any one of the above modes 1 to 7, and may preferably further include function performance instructing means for, in response to the terminal device specifying the function that the remote control system causes the controlled appliance to perform, (i) converting the specified function into a command sequence including one or more statements that the controlled appliance is capable of executing, and (ii) transmitting the command sequence to the controlled appliance, wherein: the function performance instructing means, in a case where (i) the function specified with use of the terminal device is the first function, and the function memory section stores, as the paired function, the second function in association with the first function, and (ii) the function enabling means has not processed the second function in such a manner that the second function is specifiable with use of the terminal device, discontinues the conversion of the first function or the transmission of the first function.

The above arrangement allows the function performance instructing means to, in the case where the second function is not specifiable, prevent the controlled appliance from performing the first function even if the user has specified the first function. Specifically, the function performance instructing means, in the above case, discontinues (i) creating a command sequence for the first function or (ii) transmitting the command sequence to the controlled appliance. The above arrangement thus allows the function managing device to, as long as the second function is not specifiable, prevent the controlled appliance from performing the first function even if the user has specified the first function. The above arrangement consequently allows the user to avoid a disadvantageous situation in which although the user has instructed the first function to be performed, the user cannot specify the second function to counteract the result of the first function being performed.

The function managing device according to mode 9 of the present invention is based on any one of the above modes 1 to 8, and may be arranged such that the function enabling means is screen generating means for, in response to a request from the terminal device, generating a screen including the first function as an option and the second function as an option; and the screen is displayed on the terminal device so that either of the first function and the second function is specifiable.

With the above arrangement, the function managing device, even in the case where a user has selected only the first function, processes a pair of the first function and the second function, opposite in effect to the first function, in such a manner that the first and second functions are specifiable. The above arrangement, in other words, allows the terminal device to display in its display section a screen on which either the option for the first function or the option for the second function is selectable. The above arrangement thus allows the user of the terminal device to specify not only the first function but also the second function to cause the controlled appliance to perform the first and second functions. The user of the terminal device can, in consequence, simply select a first function to make available not only the first function but also a second function opposite in effect to the first function. The above arrangement, as a result, advantageously improves convenience.

The function managing device according to mode 10 of the present invention is based on any one of the above modes 1 to 9, and may be arranged such that the first function includes an ON-function of operating the controlled appliance; and the second function includes an OFF-function of counteracting the operation of the controlled appliance.

The above arrangement allows the OFF-function to be constantly specifiable as paired with the ON-function, in other words, allows the user to avoid a disadvantageous situation in which the ON-function can undesirably be performed alone. More specifically, in the case where the user has operated the controlled appliance by mistake, the above arrangement allows the user to immediately call the OFF-function for counteracting the operation. The above arrangement, in consequence, advantageously not only provides a convenient user interface, but also allows individual users to use a remote operation system at ease.

In order to solve the above problem, a remote control system according to mode 11 of the present invention includes the function managing device according to any one of the modes 2 to 7, the terminal device including a plurality of terminal devices, the remote control system further including: a message board server for managing an electric message board that at least one of the plurality of terminal devices is capable of using, the message board server, in a case where the at least one of the plurality of terminal devices has posted onto the electric message board a comment including information read out from the function information memory section, informing the function managing device of a function associated with the information included in the comment posted, the function managing device commanding the controlled appliance to perform the function of which the function managing device has been informed.

The above arrangement allows the user to call a function through a simple operation with use of an electric message board service, and consequently facilitates remotely operating a controlled appliance present at a distant location.

In order to solve the above problem, a method according to mode 12 of the present invention for controlling a function managing device is a method for controlling a function managing device for, in a remote control system that causes a controlled appliance to perform a function specified with use of a terminal device, managing the specified function, the remote control system including a function memory section for storing the specified function therein in association with a function that is paired with and opposite in effect to the specified function, the method including the steps of: identifying, (i) as a first function to be processed so as to be specifiable with use of the terminal device, a function selected in advance with use of the terminal device, and (ii) as a second function to be processed so as to be specifiable with use of the terminal device, a paired function stored in the function memory section in association with the first function; and processing the first and second functions in such a manner that the first and second functions are each specifiable with use of the terminal device.

The function managing device may be realized by a computer. In this case, the present invention includes in its scope (i) a program for controlling a function managing device, the program causing the computer to operate as each of the means to provide the function managing device in the form of a computer, and (ii) a computer-readable recording medium storing the program therein.

The present invention is not limited to the description of the embodiments above, but may be altered in various ways by a skilled person within the scope of the claims. Any embodiment based on a proper combination of technical means disclosed in different embodiments is also encompassed in the technical scope of the present invention. Further, combining technical means disclosed in different embodiments can provide a new technical feature.

INDUSTRIAL APPLICABILITY

The present invention is applicable to a function managing device for managing a function to be performed by a controlled appliance, the function managing device processing the function so that a user can use the function (that is, so that the user can operate a terminal device to call a function that the user wants the controlled appliance to perform). The function managing device according to the present invention is particularly suitable for a remote control system that causes a controlled appliance present at a distant location to perform a function that a user has specified with use of a terminal device.

REFERENCE SIGNS LIST

1 agent server (function managing device)
2 family message board server (message board server)
3 home server
4a to c portable terminal (terminal device)
5 cleaning robot
6 air conditioner
7 illumination device
8 ion generator
10 control section
11 memory section (function memory section)
12 control section
13 memory section (function information memory section)
20 scenario creating section (function identifying means)
21 function registering section (function enabling means, function registering means)
22 function performance instructing section (function performance instructing means)
23 screen creating section (function enabling means, screen generating means)
24 function deleting section (function deleting means)
30 post accepting section
31 scenario notifying section
40 functions listing table (function memory section)
41 labels listing table
42 map information
43 function module table
44 function recipe table
50 registered scenario DB (function information memory section)
100 family message board system (remote control system)

The invention claimed is:

1. A function managing device for, in a remote control system that causes a controlled appliance to perform a function specified with use of a terminal device, managing the specified function,
the remote control system including:
a function memory section for storing the specified function therein in association with a function that is paired with and opposite in effect to the specified function; and a function information memory section for storing information on the specified function in a state where the terminal device is capable of reading out and specifying the information on the specified function, the function managing device comprising a processor configured to
(i) identify, as a first function to be processed so as to be specifiable with use of the terminal device, a function selected in advance with use of the terminal device, and (ii) identify, as a second function to be processed so as to be specifiable with use of the terminal device, a paired function stored in the function memory section in association with the first function;

register information on the first and second functions in the function information memory section so as to process the first and second functions in such a manner that the first and second functions are each specifiable with use of the terminal device; and in a response to a request from the terminal device, (i) delete, from the function information memory section, information in a function specified in the request, and in a case where the function specified in the request for deletion is the second function and the function information memory section stores, registered therein, the information on the first function associated with the second function as the paired function, (ii) delete the information on the first function together with the information on the second function.

2. The function managing device according to claim 1, wherein:
the information on the specified function is an image with which one or more functions are associated; and
the processor is configured to register information on the first and second functions, each associated with a predetermined image, in the function information memory section to process the first and second functions in the manner.

3. The function managing device according to claim 2, wherein:
the processor is configured to (i) identify, as a first function group, a plurality of functions selected in advance with use of the terminal device and (ii) identify, as a second function group, a plurality of functions that are paired with and opposite in effect to the respective functions of the first function group; and
the processor is configured to register, in the function information memory section, information on the first and second function groups each associated with a predetermined image.

4. The function managing device according to claim 3, wherein:
the first function group further includes a third function that is independent and that is not associated with a paired function; and
the processor is configured to exclude the third function from the second function group.

5. The function managing device according to claim 1, wherein:
the function memory section stores, as the paired function, a single kind of the second function in association with a plurality of kinds of the first function; and
the processor is configured to (i) delete, together with information on the single kind of the second function, information on any first function corresponding to the single kind of the second function specified for deletion, and (ii) in a case where one of the plurality of kinds of the first function has been specified for deletion and the function information memory section stores, registered therein, information on any other first function of the plurality of kinds of the first function, to not delete the information on the single kind of the second function.

6. The function managing device according to claim 1, wherein:
the processor is configured to, in response to a request from the terminal device, generate a screen including the first function as an option and the second function as and option; and
the screen is displayed on the terminal device so that either of the first function and the second function is specifiable.

7. The function managing device according to claim 1, wherein:
the first function includes an ON-function of operating the controlled appliance; and
the second function includes an OFF-function of counteracting the operation of the controlled appliance.

8. A remote control system comprising:
a function managing device according to claim 1,
the terminal device including a plurality of terminal devices,
the remote control system further comprising:
a message board server is configured to manage an electric message board that at least one of the plurality of terminal devices is capable of using,
the message board server, in a case where the at least one of the plurality of terminal devices has posted onto the electric message board a comment including information read out from the function information memory section, informing the function managing device of a function associated with the information included in the comment posted,
the function managing device commanding the controlled appliance to perform the function of which the function managing device has been informed.

9. A function managing device for, in a remote control system that causes a controlled appliance to perform a function specified with use of a terminal device, managing the specified function,
the remote control system including:
a function memory section for the storing the specified function therein in associated with a function that is paired with and opposite in effect to the specified function,
the function managing device comprising a processor configured to
(i) identify, as a first function to be processed so as to be specifiable with use of the terminal device, a function selected in advance with use of the terminal device, and (ii) identify, as a second function to be processed so as to be specifiable with use of the terminal device, a paired function stored in the function memory section in association with the first function;
in response to the terminal device specifying the function that the remote control system causes the controlled appliance to perform, (i) convert the specified function into a command sequence including one or more statements that the controlled appliance is capable of executing, and (ii) transmit the command sequence to the controlled appliance;

in a case where the function memory section stores, as the paired function, the second function in association with the first function, and the second function has not been processed in such a manner that the second function is specifiable with use of the terminal device, perform a process for preventing the conversion of the first function or the transmission of the command sequence for the first function; and in a case where (i) the first and second function have been processed in such a manner that the first and second functions are specifiable and (ii) the terminal device has specified the second function after the conversion of the first function and the transmission of the command sequence for the first function are preformed in response to the terminal device specifying the first function, perform the conversion of the second function and the transmission of the command sequence for the second function.

10. A method for controlling a function managing device for, in a remote control system that causes a controlled appliance to perform a function specified with use of a terminal device, managing the specified function, the remote control system including a function memory section for storing the specified function therein in association with a function that is paired with and opposite in effect to the specified function, the method comprising the steps of:
(a) identifying, (i) as a first function to be processed so as to be specifiable with use of the terminal device, a function selected in advance with use of the terminal device, and (ii) as a second function to be processed so as to be specifiable with use of the terminal device, a paired function stored in the function memory section in association with the first function;
(b) in a case where (i) the function memory section stores, as the paired function, the second function in associated with the first function and (ii) the first and second functions have been processed in such a manner that the first and second functions are each specifiable, converting, in response to the terminal device specifying the first function, the first function into a command sequence including one or more statements that the controlled appliance is capable of executing and transmitting the command sequence to the controlled appliance, and in the case where the terminal device has specified the second function after the transmission of the command sequence, converting the second function into a command sequence including one or more statements that the controlled appliance is capable of executing and transmitting the command sequence to the controlled appliance; and
(c) in a case where the second function has not been processed in a such a manner that the second function is specifiable, performing a process for preventing the conversion of the first function or transmission of the command sequence for the first function.

11. A non-transitory computer-readable recording medium storing therein a control program for causing a computer to carry out the method according to claim 10, the control program causing the computer to carry out the steps (a) through (c).

* * * * *